United States Patent
Kimura et al.

(10) Patent No.: US 7,219,147 B2
(45) Date of Patent: May 15, 2007

(54) METHOD OF EFFECTING PROTECTION CONTROL IN COMMUNICATION NETWORK AND RPR APPARATUS

(75) Inventors: Gaku Kimura, Kawasaki (JP); Yuzuru Ishioka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1025 days.

(21) Appl. No.: 10/299,417

(22) Filed: Nov. 19, 2002

(65) Prior Publication Data

US 2003/0233579 A1 Dec. 18, 2003

(30) Foreign Application Priority Data

Jun. 17, 2002 (JP) ............................... 2002-176277

(51) Int. Cl.
*G06F 15/173* (2006.01)
(52) U.S. Cl. ..................................................... 709/224
(58) Field of Classification Search ................ 709/224; 714/4
See application file for complete search history.

(56) References Cited

U.S. PATENT DOCUMENTS 6,850,486 B2 * 2/2005 Saleh et al. ................. 370/218
6,856,627 B2 * 2/2005 Saleh et al. ................. 370/397

OTHER PUBLICATIONS

Bellcore Issue 4, Dec. 1998; GR-1230-CORE.
Bellcore Issue 3, Sep. 2000; GR-253-CORE.

* cited by examiner

*Primary Examiner*—David Y. Eng
(74) *Attorney, Agent, or Firm*—Katten Muchin Rosenman LLP

(57) ABSTRACT

An object of the present invention is to propose a method of effecting a protection control for use in a communication network which makes it possible to avoid conflict between a protection switch of a SONET apparatus and a protection switch of an RPR apparatus. To this end, when ring switching of the BLSR is validated, the protection function of the RPR apparatus is invalidated while when the protection function of the RPR apparatus is validated, the ring switching of the BLSR is invalidated. The apparatus of the present invention can be applied to a network in which a ring network formed of a BLSR is connected with an RPR apparatus.

22 Claims, 9 Drawing Sheets

METHOD OF EFFECTING PROTECTION CONTROL IN COMMUNICATION NETWORK AND RPR APPARATUS

BACKGROUND OF THE INVENTION

1. Field of the Invention

The present invention relates to a method of effecting a protection control in a communication network and an RPR apparatus suitable for use in a communication network of an EOS (Ethernet Over SONET) in particular, in which a resilient packet ring (RPR) of the Ethernet (R) is placed upon a bidirectional line-switched ring (BLSR) composed of a plurality of synchronous optical network (SONET) apparatus, i.e., a ring network formed of the BLSR is connected with the RPR apparatus.

2. Description of the Related Art

Recently, the Internet becomes more and more widely deployed in a communication field and with this trend, amount of communication information exchanged by means of IP (Internet Protocol) is remarkably increased. The IP communication is originally developed for data communication as a main object. Therefore, the IP communication has not been requested to have a high real time property as compared with a voice communication. Accordingly, even if any failure is brought about in the communication network, the communication network can be relatively free from a severe demand that might be imposed on the communication network in terms of a period of time it takes for the communication network to restore a network failure.

However, communication service demand has been steadily increased in the IP communication. As a consequence, the application field of the IP communication is expanded. At the same time, it is requested to provide a more reliable communication network. However, owing to the establishment of an RPR technology, high reliability can be secured even in the IP communication.

In this case, RPR is a technology which exerts its optimum performance upon data traffic in a network such as Ethernet. The RPR technology also has a historical background as has been developed as a ring network which is endurable in the requested reliability of WAN (Wide Area Network). In the RPR technology, an Ethernet frame is encapsulated within an RPR frame so that the Ethernet frame can function as a part of the RPR ring network.

On the other hand, the conventional SONET transmission network has been mainly developed as a network for communication with a speech signal and the network comes to have a large size in infrastructure. When the network employing the above-mentioned RPR technology is requested to be constructed by using the technology of the current status with ease effectively, it is considered that to introduce the infrastructure of the SONET transmission network into the network employing the above-mentioned RPR technology is an effective means.

In this case, the BLSR is a SONET network formed as a ring. According to the arrangement of the protection function of the BLSR, the network is provided with a redundant network in which a signal is allowed to be transmitted in a direction of the ring inverse to the direction in which the signal is ordinarily transmitted through a working network. With this arrangement, when any failure is brought about in the work network, the signal path can be switched from the working network to the network provided as a redundancy, and the failure can be recovered.

The RPR technology has been developed with an intention that the IP communication system comes to have a protection function having a reliability substantially equivalent to that of the conventional SONET transmission system. The protection function based on the RPR technology can be realized in the following manner in Ethernet ring network, for example. That is, packets assigned with different priority orders are ordinarily transmitted through the ring network bidirectionally. If any failure is brought about in the network for transmitting the packets in one direction of the ring path, the packet transmission is changed from the network suffering from the failure to one having no failure. At this time, the packets are brought into a transmission process one by one in accordance with the priority orders which are assigned to the packets in advance, respectively. That is, a packet having relatively high priority order is transmitted prior to one having relatively low priority order.

In this case, when the RPR transmitting apparatus (RPR apparatus) is provided in the SONET network, arrangement is made on the network operation in such a manner that the protection function of the SONET is effected prior to the protection function of the RPR apparatus. In more concretely, when any failure is detected in the RPR apparatus and the protection function is activated in the manner described above, a delay time is set in the network by user's manual input (key input operation through a user interface).

However, according to the above-described conventional technology, even if the RPR apparatus is equipped with a protection switching function which is highly reliable and capable of operating at a high speed, it takes a long period of time for switching from the network under current working status to the redundant network upon effecting the SONET protection function for failure restoration. As a consequence, the reliability (a networking rate) of the network can be lowered. Further, if the delay time is set to zero, it is expected that the protection switch of the SONET and the protection switch of the RPR apparatus conflict with each other.

The conflict of the protection switch of the BLSR and the protection switch of the RPR apparatus is taken place in the following manner. That is, for example, the switching of the RPR protection is effected on one network failure and thereafter the switching of the BSLR is effected on the same network failure. Then, the RPR apparatus perceives that the failure is restored, and hence the RPR apparatus tries to return the switching status to one which the protection switch of the RPR took before the failure was brought about. As a consequence, unstable reciprocal switching motion can be brought about in the RPR switch. In this case, either of the switching operation of the RPR apparatus or that of the BLSR is sufficient for restoring the failure.

In other words, the conflict of the protection functions results in useless switching motion, which fact can cause an undesirable hit (signal jump).

SUMMARY OF THE INVENTION

The present invention is made in view of the above aspect. Therefore, it is an object of the present invention to provide a method of effecting protection control and an RPR apparatus for use in a communication network which makes it possible to avoid a conflict between the protection switch of the SONET and the protection switch of the RPR apparatus and to secure the network reliability.

According to the present invention, there is proposed a method of effecting protection control for use in a communication network in which a bidirectional line-switched ring (BLSR) composed of a plurality of synchronous optical network (SONET) apparatus connected to one another to form a ring is connected with a resilient packet ring (RPR), each of the BLSR and the RPR apparatus having an independent protection function, the method of effecting protection control for use in a communication network arranged in such a manner that when a ring switching of the BLSR is validated, the protection function of the RPR apparatus is invalidated, and when the protection function of the RPR apparatus is validated, the ring switching of the BLSR is invalidated.

The method of effecting protection control maybe arranged so that, when the protection function of the RPR apparatus is validated, the RPR apparatus generates an invalidating request instructing that the protection function of the BLSR of the SONET apparatus should be invalidated, and when the SONET apparatus receives the invalidating request from the RPR apparatus, the SONET apparatus controls the BLSR so that the protection function thereof is invalidated and the protection function of the RPR apparatus is made operable.

In this case, the method of effecting protection control may be arranged so that, the invalidating request is transmitted from the RPR apparatus to all of the SONET apparatus constituting the BLSR by using an empty bit of a path overhead of a SONET frame which is transmitted or received among the SONET apparatus constituting the BLSR and the RPR apparatus.

Further, the method of effecting protection control may be arranged so that, when the protection function of the RPR apparatus is made operable, the SONET apparatus constituting the BLSR examine the network state of the BLSR, when it is determined that it is necessary to activate the protection function of the RPR apparatus in accordance with a result of the examination, a validating request of the protection function of the RPR apparatus is sent to the RPR apparatus, and control is made to bring the protection function into an operation allowable mode in the RPR apparatus in accordance with the request.

More preferably, the method of effecting protection control may be arranged so that, when the SONET apparatus informs the RPR apparatus that the protection function of the RPR apparatus is requested to be activated, this information is transmitted by using an empty bit of a line overhead of the SONET frame transmitted to the RPR apparatus.

Further, the method of effecting protection control may be arranged so that, the RPR apparatus monitors whether or not a switching mode for halting the protection function of the BLSR is taken place in the SONET apparatus within the communication network, if it is determined that the switching mode for invalidating the protection function of the BLSR is taken place in accordance with the result of the monitoring, the protection function of the RPR apparatus is validated, and if control is made to take place a switching mode that the protection function of the BLSR is kept in a validated state, the protection function of the RPR apparatus is invalidated.

In this case, the method of effecting protection control may be arranged so that, the SONET apparatus informs the RPR apparatus of information indicating whether the switching mode that the protection function of the BLSR is halted is taken place or not, and the RPR apparatus carries out the monitoring based on the received information indicating whether the switching mode that the protection function of the BLSR is halted is taken place or not.

Also in this case, the method of effecting protection control may be arranged so that, the SONET apparatus informs the RPR apparatus of information indicating whether the switching mode that the protection function of the BLSR is halted is taken place or not, by using an empty bit of the line overhead of the SONET frame.

More preferably, the method of effecting protection control may be arranged so that, the switching mode that the protection function of the BLSR is halted is effected by Lockout of Protection or Forced Switch.

According to the present invention, there is provided a resilient packet ring (RPR) apparatus for use in a communication network in which a bidirectional line-switched ring (BLSR) composed of a plurality of synchronous optical network (SONET) apparatus connected to one another to form a ring is connected with the RPR apparatus, each of the BLSR and the RPR apparatus having an independent protection function, the RPR apparatus including a determining unit for determining whether an instruction indicating that the protection function of the BLSR should be prohibited from being activated is received or not, and an invalidating request outputting unit for outputting an invalidating request indicating that the protection function of the BLSR in the SONET apparatus should be invalidated if the determining unit determines that the instruction is received.

In this case, the RPR apparatus may be arranged so that, when the determining unit determines the instruction has not been received yet, the protection function of the RPR apparatus is prevented from being valid.

Further, in the RPR apparatus, the invalidating request outputting unit may include an overhead writing unit for writing bit information indicative of the invalidating request as overhead information, a mapping unit for mapping the overhead information written by the overhead writing unit on the SONET frame, and a transmitting unit for transmitting the SONET frame having the overhead information mapped thereon by the mapping unit.

According to the present invention, there is also provided a resilient packet ring (RPR) apparatus for use in a communication network in which a bidirectional line-switched ring (BLSR) composed of a plurality of synchronous optical network (SONET) apparatus connected to one another to form a ring is connected with the RPR apparatus, each of the BLSR and the RPR apparatus having an independent protection function, the RPR apparatus including a monitoring unit for monitoring whether or not the SONET apparatus within the communication network sends a request command to the RPR apparatus for activating the protection function, and a switching unit for carrying out switching operation enabling the protection function of the RPR apparatus to be activated if the monitoring unit determines that the SONET apparatus sends the request command to the RPR apparatus for activating the protection function of the RPR apparatus.

In the above RPR apparatus, the monitoring unit may be arranged to include an overhead reading unit for reading overhead information from the SONET frame which is sent from the SONET apparatus constituting the BLSR, and a determining unit for determining whether the protection operation of the RPR apparatus is requested or not, based on the overhead information read by the overhead reading unit.

Further, according to the present invention, there is provided a synchronous optical network (SONET) apparatus for use in a communication network in which a bidirectional line-switched ring (BLSR) composed of the plurality of SONET apparatus connected to one another to form a ring is connected with a resilient packet ring (RPR) apparatus, each of the BLSR and the RPR apparatus having an independent protection function, the SONET apparatus including a determining unit for determining whether or not an instruction instructing that the protection function of the BLSR should be invalidated is received from the RPR apparatus, and a switching unit for carrying out transferring processing on the instruction that the protection function of the BLSR should be invalidated, in accordance with the result of determination made by the determining unit.

In this case, the SONET apparatus may include a determining unit for determining whether or not the protection function of the RPR apparatus should be validated under condition that the protection function of the BLSR is invalidated, and an instructing unit for outputting an instruction enabling the protection function of the RPR apparatus to be activated, in accordance with the result of determination made by the determining unit.

According to the present invention, there is also provided a synchronous optical network (SONET) apparatus for use in a communication network in which a bidirectional line-switched ring (BLSR) composed of the plurality of SONET apparatus connected to one another to form a ring is connected with a resilient packet ring (RPR) apparatus, each of the BLSR and the RPR apparatus having an independent protection function, the SONET apparatus include a determining unit for determining whether the switching mode that the protection function of the BLSR is halted is set or not, and an informing unit responding to a switching mode setting which makes the protection function of the BLSR be halted in accordance with the result of determination made by the determining unit, sending to the RPR apparatus an informing message indicating that this switching mode is set in the protection function of the BLSR, and thereby activating the protection function of the RPR apparatus.

As described in detail above, according to the present invention, in the communication network having the BLSR connected with the RPR apparatus in which each of the BLSR and the RPR apparatus has its independent protection function, activating state allowable mode is placed in only either the protection function of the SONET or the protection function of the RPR apparatus. Therefore, it becomes possible to avoid reliably the conflict between the protection function of the SONET and the protection function of the RPR apparatus, and it becomes possible to secure network reliability.

Moreover, if the protection switching function of the BLSR is substantially brought into a halted mode due to the switching status of the SONET apparatus as nodes of the BLSR, the protection function of the RPR can be automatically brought into the operation allowable mode. Accordingly, the reliability of the network can be more improved.

Furthermore, it becomes possible to suppress the unstable reciprocal switching action which would be brought about on the RPR when the protection switch function of the BLSR and the protection switch function of the RPR conflict with each other.

DESCRIPTION OF THE PREFERRED EMBODIMENTS

Embodiments of the present invention will be hereinafter described with reference to the attached drawings.

[A] Description of First Embodiment

[A-1] Description of Communication Network According to First Embodiment

Figure 2:
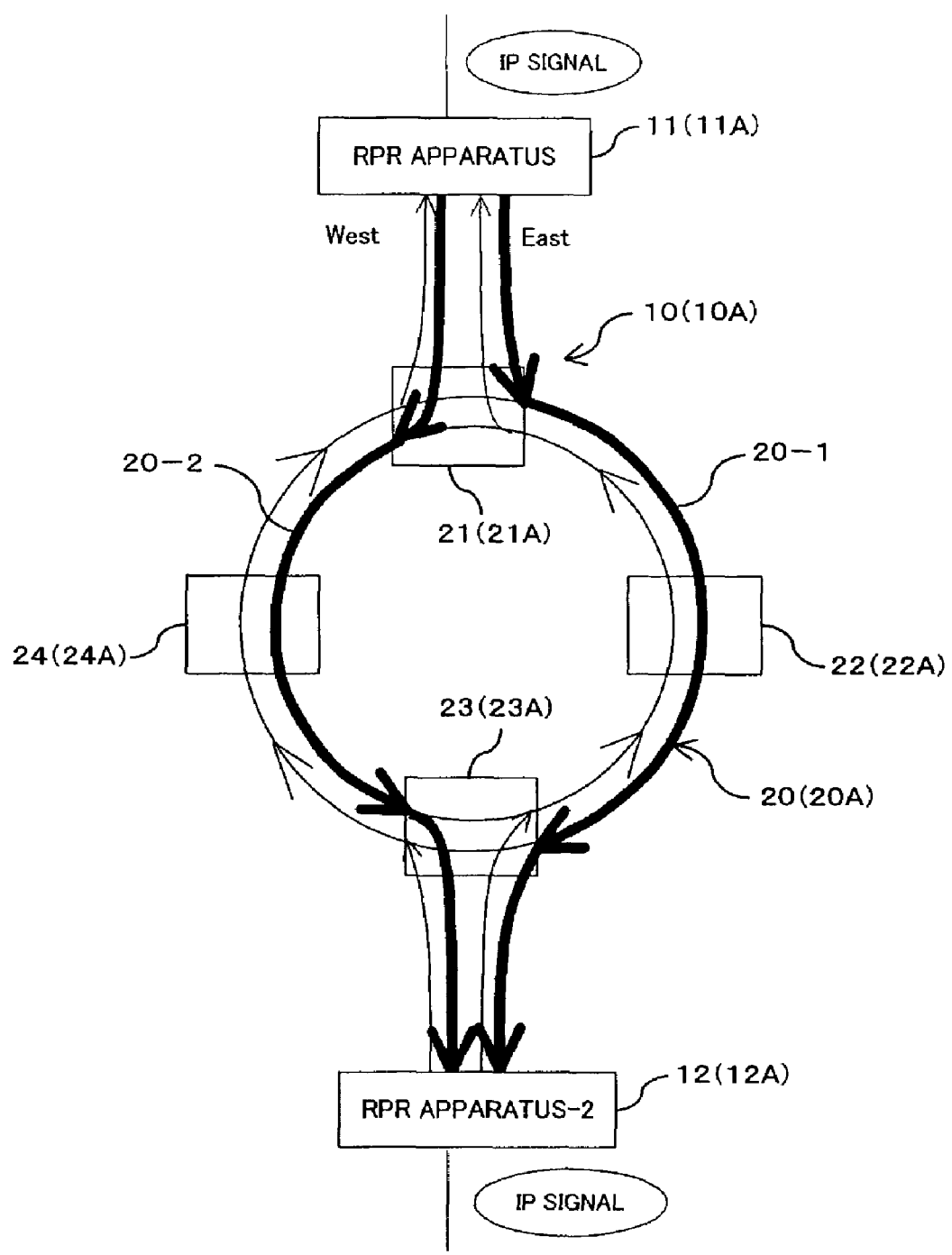
FIG. 2 is a diagram showing a communication network in which the first embodiment of the present invention can be implemented.

FIG. 2 is a diagram showing a communication network to which the first embodiment of the present invention is applied. As shown in FIG. 2, the communication network is provided with RPR apparatus and SONET apparatus. The communication network is arranged so as to implement a protection control as a characteristic feature of the present invention which will be more fully described later on.

In FIG. 2, reference numeral 10 represents a resilient packet ring (RPR). This RPR 10 is composed of a couple of RPR apparatus 11, 12 connected to a bidirectional line-switched ring (BLSR) 20 which is formed of, for example, four synchronous optical network (SONET) apparatus 21 to 24 connected to one another through optical fibers so as to form a ring-like network.

In more concretely, the RPR apparatus 11 is connected to the SONET apparatus 21 and the RPR apparatus 12 is connected to the SONET apparatus 23. A signal transmitted from the RPR apparatus 11 is transmitted through a couple of signal paths (i.e., East path 20-1 including the SONET apparatus 21 to 23 of the BLSR 20 and West path 20-2 including the SONET apparatus 21, 24, 23 of the BLSR 20) to the RPR apparatus 12.

In this way, a signal transmitted from the RPR apparatus 11 to the RPR apparatus 12 will travel the above-described two signal paths to carry out communication. When any failure is brought about in the network, the protection function of the RPR apparatus is effected to support the communication.

In more concretely, the signal is ordinarily transmitted through the couple of signal paths 20-1 and 20-2 by using a bandwidth twice that of a case where a single path is utilized. However, if one of the transmission paths, e.g., the transmission path between the SONET apparatus 22 and 23 suffers from a failure, the signal will be transmitted through the path 20-2 having no failure. In this case, signals to be transmitted from the RPR 11 to the RPR 12 are assigned with priority orders, respectively, in accordance with the degree of importance or priority of the packet forming each signal, and formed into a frame structure. Then, these signals are transmitted sequentially based on the order of priority or the degree of importance.

While the above description is made on a case where the signal is transmitted from the RPR apparatus 11 to the RPR apparatus 12, signals can be transmitted from the RPR apparatus 12 to the RPR apparatus 11 through the couple of signal paths (i.e., signal paths of 20-1 and 20-2 in the inverse direction).

The BLSR 20 also has its independent protection function. In more concretely, the signal is ordinarily transmitted through the couple of signal paths 20-1 and 20-2 by using a bandwidth twice that of a case where a single path is utilized. However, if one of the transmission paths, e.g., the transmission path between the SONET apparatus 22 and 23 suffers from a failure, the signal path switching is made at the SONET apparatus 22 from the signal path 20-1 to the signal path 20-2 so that a SONET frame to be transmitted through the signal path 20-1 will be transmitted through the path 20-2 in an inverse direction.

Figure 1:
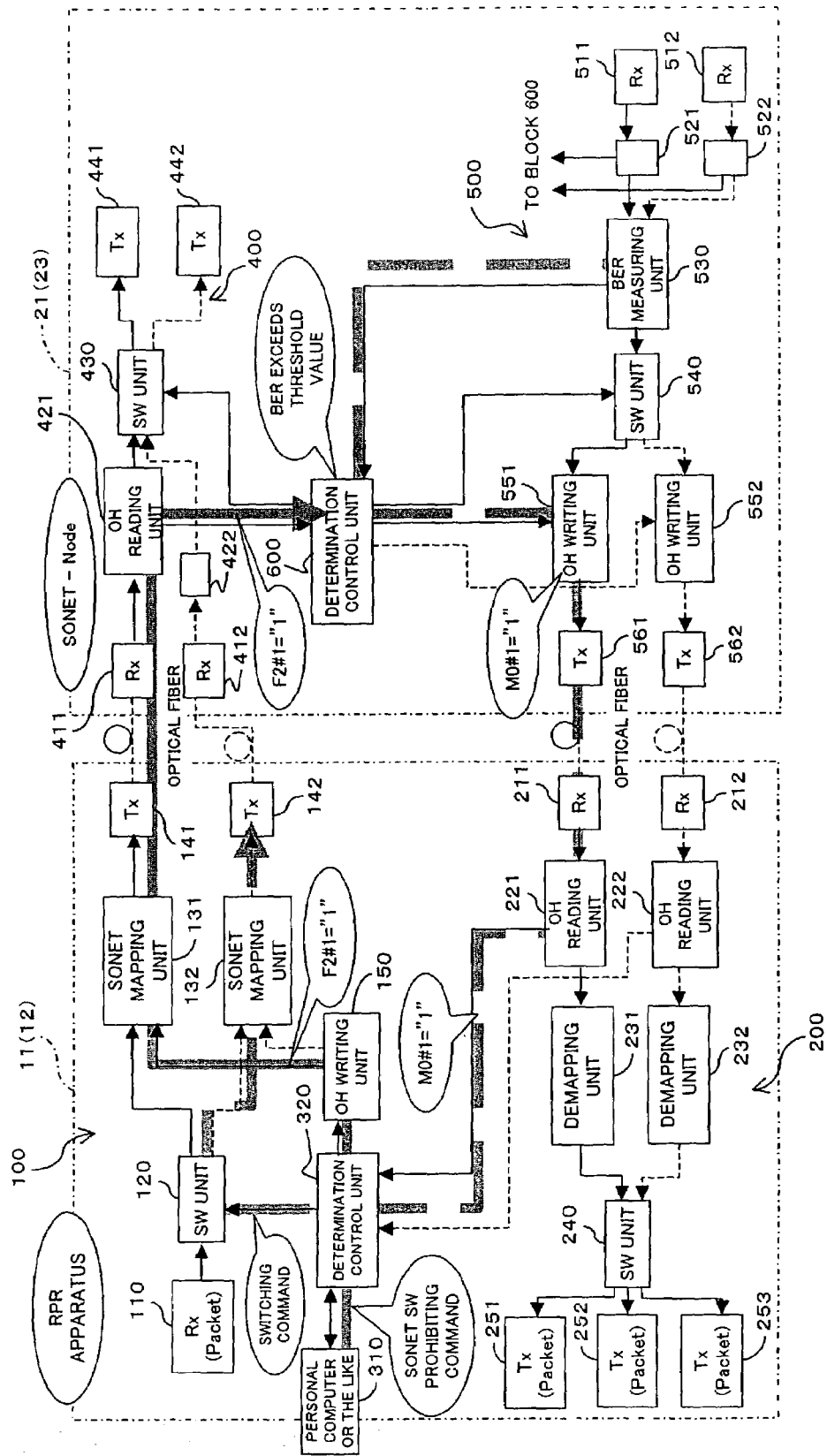
FIG. 1 is a block diagram showing an RPR apparatus and a SONET apparatus employed in a first embodiment of the present invention.

[A-2] Description on Overall Arrangement of RPR Apparatus and SONET Apparatus 21 of First Embodiment FIG. 1 shows in detail an arrangement of the RPR apparatus 11 (or the RPR apparatus 12) on the frame signal transmission side. FIG. 1 also shows in detail an arrangement of the SONET apparatus 21 to 24 which receives the frame signal transmitted from the RPR apparatus 11 (12) and sends the same to its destination.

In the following explanation, description will be mainly made on the arrangement of the RPR apparatus 11 and the SONET apparatus 21.

As shown in FIG. 1, the RPR apparatus 11 includes a first signal processing unit 100 for receiving an IP packet sent from a network such as a LAN (Local Area Network) not shown and sending the IP packet to the RPR apparatus 12 through the BLSR 20 in a form of SONET frame. The RPR apparatus 11 also includes a second signal processing unit 200 for receiving a frame sent from the RPR apparatus 12, a user interface 310 and a determination control unit 320 for controlling the first and second signal processing units 100 and 200 in signal processing.

The first signal processing unit 100 of the RPR apparatus 11 is arranged to include a packet receiving unit (Rx) 110, a switch unit (SW unit) 120, SONET mapping (SONET Mapping) units 131, 132, frame transmitting units (Tx) 141, 142, and an overhead (OH) writing unit 150.

The packet receiving unit (Rx) 110 is a unit for receiving an IP packet sent from a network which is accommodated within the RPR apparatus 11, although not shown. The switch unit 120 is a unit for carrying out switching between the destination path 20-1 and 20-2 for the IP packet received by the packet receiving unit 110 depending on the degree of priority or importance of the subject packet.

The SONET mapping unit 131, 132 is a unit for mapping the information of the IP packet having undergone the switching processing in the switch unit 120 together with the necessary overhead information written by the overhead writing unit 150 so that a SONET frame is constructed. The SONET mapping unit 131 is a unit for constructing a SONET frame to be sent through the path 20-1 while the SONET mapping unit 132 is a unit for constructing a SONET frame to be sent through the path 20-2.

The frame transmitting unit 141, 142 is a unit for transmitting a signal of the SONET frame constructed by the SONET mapping unit 131, 132 as an optical signal through an optical fiber to the SONET apparatus 21.

The second signal processing unit 200 is arranged to include frame receiving units (Rx) 211, 212, overhead (OH) reading units 221, 222, demapping (Demapping) units 231, 232, a switch unit (SW) 240 and packet transmitting units (Tx) 251 to 253.

The frame receiving unit 211, 212 of the second signal processing unit 200 is a unit for receiving a signal (optical signal) of the SONET frame sent from the SONET apparatus 21, converting the optical signal into an electric signal and outputting the electric signal to the overhead reading unit 221, 222 provided on the downstream stage. The frame receiving unit 211 is a unit for receiving a SONET frame sent by way of the SONET apparatus 23, 22, 21 (path 20-1) while the frame receiving unit 212 is a unit for receiving a SONET frame sent by way of the SONET apparatus 23, 24, 21 (path 20-2 in the inverse direction).

The overhead reading unit 221 is a unit for reading overhead information contained in the SONET frame received by the frame receiving unit 211. The overhead reading unit 222 is a unit for reading overhead information contained in the SONET frame received by the frame receiving unit 212.

The demapping unit 231 effects demapping operation on the SONET frame which has overhead information read by the overhead reading unit 221 and is sent through the path 20-1 in the inverse direction. The demapping unit 231 also converts the payload information contained in the SONET frame into IP packet data. Similarly, the demapping unit 232 effects demapping operation on the SONET frame which has overhead information read by the overhead reading unit 222 and is sent through the path 20-2 in the inverse direction, and also converts the payload information contained in the SONET frame into IP packet data.

The switch unit 240 is supplied with the IP packets obtained by the demapping operation effected by the demapping unit 231, 232, and selects a desired connection so that the IP packet is sent to respective destinations.

The user interface 310 is composed of a personal computer or the like. This unit allows a user to input a command regarding the operation of the RPR apparatus 11. The determination control unit 320 is a unit operated in accordance with a command inputted by means of the user interface 310 or the overhead information read by the overhead reading unit 221 or 222 of the second signal processing unit 200. With the operation of the determination control unit 320, control is effected on the switching processing of the above-described switch units 120 and 240 as well as the overhead writing processing carried out by the overhead writing unit 150.

The SONET apparatus 21 is arranged to include a first signal processing unit 400 for transferring a signal of the SONET frame sent from the RPR apparatus 11 to the SONET apparatus 22 or the SONET apparatus 24 depending on path selection from the paths 20-1 and 20-2, a second signal processing unit 500 for transferring a signal of the SONET frame sent from the SONET apparatus 22 or SONET apparatus 24 to the RPR apparatus 11, and a determination control unit 600 for controlling the signal processing by the first and second signal processing units 400 and 500.

The first signal processing unit 400 of the SONET apparatus 21 is arranged to include frame receiving units 411, 412, overhead reading units 421, 422, a switch unit 430 and frame transmitting units 441, 442.

The frame receiving unit 411, 412 of the second signal processing unit 400 is a unit for receiving a signal (optical signal) of the SONET frame sent from the first signal processing unit 100 of the RPR apparatus, converting the optical signal into an electric signal and outputting the electric signal to the overhead reading unit 421, 422 provided on the downstream stage. The frame receiving unit 411 is a unit for receiving a SONET frame to be transferred through the path 20-1 while the frame receiving unit 412 is a unit for receiving a SONET frame to be transferred through the path 20-2.

The overhead reading unit 421 is a unit for reading overhead information of the SONET frame received by the frame receiving unit 411. The overhead reading unit 422 is a unit for reading overhead information of the SONET frame received by the frame receiving unit 412.

The switch unit 430 is a unit for effecting switching operation based on the overhead information on the frame signal which the overhead reading units 421 and 422 read to obtain the overhead information thereof. With this switching operation, the frame signal can be sent to its destination through a desired path.

The frame transmitting unit 441 is a unit for sending the SONET frame having undergone the switching operation in the switch unit 430 to the SONET apparatus 22 as a destination. The frame transmitting unit 442 is a unit for sending the SONET frame having undergone the switching operation in the switch unit 430 to the SONET apparatus 24 as a destination.

The second signal processing unit 500 is arranged to include frame receiving units 511, 512, overhead reading units 521, 522, a BER (Bit Error Rate) measuring unit 530, a switch unit 540, overhead writing units 551, 552 and frame transmitting units 561, 562.

The frame receiving unit 511 is a unit for receiving a SONET frame signal sent from the SONET apparatus 22 and outputting the signal as an electric signal to the overhead reading unit 521 provided on the subsequent stage. The frame receiving unit 512 is a unit for receiving a SONET frame signal sent from the SONET apparatus 24 and outputting the signal as an electric signal to the over head reading unit 522 provided on the subsequent stage.

The overhead reading unit 521 is a unit for reading the overhead information of the SONET frame received by the frame receiving unit 511. The overhead reading unit 522 is a unit for reading the overhead information of the SONET frame received by the frame receiving unit 512.

The BER measuring unit 530 is a unit for measuring the bit error rate of the SONET frame which the overhead reading units 521 and 522 read to obtain the overhead information thereof. The BER measuring unit 530 further notifies the determination control unit 600 of the result of the measurement.

The switch unit 540 is a unit for effecting switching processing on the SONET frame of which bit error rate was measured by the BER measuring unit 530. With this switching processing, the SONET frame can be sent to its destination through a desired path. The overhead writing units 551 and 552 are each unit for writing necessary overhead information (to update the overhead information) into the SONET frame having undergone the switching operation in the switch unit 540 in accordance with the control of the determination control unit 600.

The frame transmitting unit 561 is a unit for transmitting, as an optical signal, the SONET frame signal into which the overhead writing unit 551 wrote over head information to the frame receiving unit 211 of the RPR apparatus 11 through an optical fiber. Similarly, the frame transmitting unit 562 is a unit for transmitting, as an optical signal, the SONET frame signal into which the overhead writing unit 552 wrote overhead information to the frame receiving unit 212 of the RPR apparatus 11 through an optical fiber.

The determination control unit 600 is a unit for controlling the switch units 430 and 540 and the overhead writing units 551 and 552 based on the overhead information read by the overhead reading units 421, 422, 521, 522 and the bit error rate measured by the BER measuring unit 630.

In the above description with reference to FIG. 1, description has been made by using different reference numerals assigned to the switch units 120 and 240 of the RPR apparatus 11, respectively, and also different reference numerals assigned to the switch units 430 and 540 of the SONET apparatus 21, respectively. However, these switch units may be formed into a single function unit within respective apparatus.

In this case, for example, the frame transmitting unit 441 of the SONET apparatus 21 will be connected to the frame receiving unit 511 of the SONET apparatus 22 on the side of the path 20-1 adjacent to the SONET apparatus 21 through an optical fiber. Further, the frame transmitting unit 442 of the SONET apparatus 21 will be connected to the frame receiving unit 512 of the SONET apparatus 24 on the side of the path 20-2 adjacent to the SONET apparatus 21 through an optical fiber.

[A-3] Description of Characteristic Feature of RPR Apparatus 11 and SONET Apparatus 21 of First Embodiment As shown in FIG. 2, the communication network has an arrangement having the RPR 10 placed upon the BLSR 20. However, each of the network components, i.e., the RPR apparatus 11 and 12 and the SONET apparatus 21 to 24 has an arrangement which makes it possible to avoid the conflict between the above-described protection function of the RPR 10 and the same of the BLSR 20.

That is, if the ring switching of the BLSR 20 is placed in a valid mode, then the protection function of the RPR apparatus 11 is placed in an invalid mode. Conversely, if the protection function of the RPR apparatus 11 is placed in a valid mode, then the ring switching of the BLSR 20 is placed in an invalid mode.

At this time, the above-described user interface 310 of the RPR apparatus 11 allows a user to input a command for prohibiting switching operation as the protection operation of the SONET (hereinafter referred to as SONET switch changeover prohibiting command), whereby it becomes possible to avoid the above-described conflict between the protection function of the RPR 10 and the protection function of the BLSR 20.

The determination control unit 320 determines whether or not the SONET switch changeover prohibiting command has been inputted through the user interface 310. In other words, the above-described user interface 310 and the determination control unit 320 function as a determining unit for determining whether any command for prohibiting the protection function of the BLSR 20 has been issued or not.

The determination control unit 320 outputs an instruction indicative of the SONET switch changeover permission to the overhead writing unit 150 when the prohibiting command is not inputted yet. Also, the determination control unit 320 outputs an instruction indicative of the SONET switch changeover prohibition to the same unit when the prohibiting command has been inputted.

In more detail, the determination control unit 320 controls the switch unit 120 in such a manner that, when the unit receives an instruction indicating that the protection function of the BLSR 20 shall be prohibited, then the RPR apparatus 11 is made allowable to activate the protection function thereof while when the unit receive no such instruction, then the RPR apparatus is prohibited from activating the protection function thereof.

When the overhead writing unit 150 receives from the aforesaid determination control unit 320, an instruction indicating that the SONET switch is prohibited from doing switching, the overhead writing unit 150 writes bit information corresponding to the instruction into the overhead information of the SONET frame which is to be sent to the SONET apparatus 21.

In more concretely, the overhead writing unit 150 responds to the reception of the instruction regarding the SONET switch changeover from the aforesaid determination control unit 320 in such a manner that, if the received instruction indicates permission of the SONET switch changeover, the overhead writing unit 150 writes bit information of "0" into F2#1 bit (F2 byte: User channel byte of Path Overhead) provided in the overhead of the SONET frame while if the received instruction indicates prohibition of the SONET switch change over, the overhead writing unit 150 writes bit information of "1" into the same bit provided in the overhead of the SONET frame, respectively, for example.

In other words, if the bit information written in F2#1 bit is a digit of "1", this bit information serves as an invalidating request indicating that the protection function of the BLSR 20 is requested to be invalidated. Meanwhile, the bit information may be written not only into F2#1 bit of the overhead of the SONET frame which is directed to both of the paths 20-1 and 20-2 but also written into F2#1 bit of the overhead of the SONET frame which is directed to one of the paths, i.e., the path 20-1.

Accordingly, the SONET mapping unit 131 (132) and the frame transmitting unit 141 (142) can function together with the aforesaid overhead writing unit 150 as an invalidating request outputting unit for outputting an invalidating request which indicates that the protection function of the SONET apparatus 21 (22 to 24) should be invalidated when the determination control unit 320 as the determining unit determines the aforesaid instruction has been received.

Moreover, the SONET mapping unit 131 (132) can function as a mapping unit for mapping the overhead information written by the overhead writing unit 150 on the SONET frame. The frame transmitting unit 141 (142) can function as a transmitting unit for transmitting the SONET frame having the overhead information having been subjected to the mapping process in the SONET mapping unit 131 (132).

The overhead reading unit 421 of the SONET apparatus 21 is arranged to examine the overhead of the SONET frame received by the frame receiving unit 411 and output the result of examination on the overhead of the SONET frame to the determination control unit 600. When the determination control unit 600 receives the result of examination on the overhead of the SONET frame, the determination control unit 600 determines whether or not the bit information of "1" indicating that switch changeover is prohibited is written in the F2#1 bit as described above.

At this time, if the determination control unit 600 identifies that the digit entered in F2#1 bit is "0" as a result of reading the overhead information, then the determination control unit 600 controls the switch units 430 and 540 so that switching is carried out to effect the protection function of the SONET. Conversely, if the determination control unit 600 identifies that the digit entered in F2#1 bit is "1" as a result of reading the overhead information, then the determination control unit 600 controls the switch units 430 and 540 so that switching mode is selected to prohibit the protection function of the SONET.

In FIG. 1, arrows of bold solid lines represent flow of signals for prohibiting the SONET switch changeover. Further, the bit information of F2#1 bit "1", i.e., a bit information for selecting the switching operation for prohibiting the protection function of the SONET apparatus, is also delivered to other SONET apparatus 22 to 24 constituting the BLSR 20. Thus, all of the SONET apparatus constituting the whole network of the BLSR 20 can be subjected to the control in the switching operation which prohibits the protection function of the SONET apparatus from being activated.

Accordingly, the above-described overhead reading units 421 and 422 and the determination control unit 600 of the SONET apparatus 21 can function as a determining unit for determining whether or not the SONET apparatus 21 receives from the RPR apparatus an instruction indicating that the protection function of the BLSR 20 should be invalidated. Further, the above-described overhead reading units 421 and 422 of the SONET apparatus 21 can function as a switch unit for carrying out a transfer processing for invalidating the protection function of the BLSR 20 in accordance with the result of determination made by the determination control unit 600 as the part of determining unit.

If the protection function prohibiting mode is placed in the SONET, for example, the determination control unit 600 of the SONET apparatus 21 determines whether or not the value of the bit error rate measured by the BER measuring unit 530 exceeds a predetermined threshold value [e.g., BERSD (BERSF)].

If the determination control unit 600 determines that the value of the bit error rate measured by the BER measuring unit 530 exceeds the predetermined threshold value as a result of analysis on the bit error rate value, then the determination control unit 600 supplies to the overhead writing unit 551 an instruction that overhead information shall be written for requesting the protection switch operation (protection operation effected by the RPR apparatus) from the ROR apparatus 11.

In more concretely, the overhead writing unit 551 responds to the instruction in such a manner that if the protection switch operation is not requested from the RPR apparatus 11, then a digit of "0" is entered in M0#1 bit [M0 byte: STS-1 REI-L byte of Line Overhead (1 to 4 bits are undefined at the current status)] while if the protection switch operation is requested from the RPR apparatus 11, then a digit of "1" is entered in the same bit.

If a SONET frame comes to have a bit information of "1" written in M0#1 bit forming the overhead for requesting the protection operation effected by the RPR apparatus, this SONET frame is transmitted to the RPR apparatus 11 by the frame transmitting unit 561.

Accordingly, it follows that the above-described BER measuring unit 530 and the determination control unit 600 are arranged as a determining unit for determining whether or not the protection operation should be activated by the RPR apparatus. Moreover, the overhead writing unit 551 (552) and the frame transmitting unit 561 (562) can function as an instructing unit for outputting an instruction for effecting the protection function by the RPR apparatus 11 based on the result of determination made by the determination control unit 600 as a part of the determining unit.

The overhead reading unit 221 of the RPR apparatus 11 reads the overhead information of the SONET frame received by the frame receiving unit 211. The determination control unit 320 is informed of the result of the reading operation.

The determination control unit 320 determines whether or not the protection operation is requested from the RPR apparatus 11 based on the overhead information read by the overhead reading unit 221. In more concretely, if a bit of "1" is read from the M0#1 bit by the overhead reading unit 221, the determination control unit 320 controls the protection operation of the RPR apparatus 11 by outputting an instruction to the switch unit 120.

Accordingly, the above-described overhead reading unit 221 (222) and the determination control unit 320 can function as a monitoring unit for monitoring whether an instruction requesting the protection operation from the RPR apparatus 11 is issued from the SONET apparatus 21 within the communication network. Furthermore, the switch unit 120 can function as a switch unit for executing switching operation based on the protection function of the RPR apparatus 11 when the RPR apparatus 11 is requested to effect the protection operation based on the result of the monitoring made by the determination control unit 320 as a part of the monitoring unit.

In FIG. 1, arrows of bold broken lines represent flow of a signal for activating switching operation. This signal is generated when the RPR apparatus 11 receives the protection switch requesting instruction from the SONET apparatus 21, and the protection function of the RPR apparatus is activated by the signal.

[A-4] Description on Protection Control Operation Effected in Communication Network According to First Embodiment The first embodiment of the present invention will be hereinafter described with reference to flowcharts of FIGS. 3 to 5. The description will be made mainly on the protection control operation effected by the RPR 10.

Figure 3:
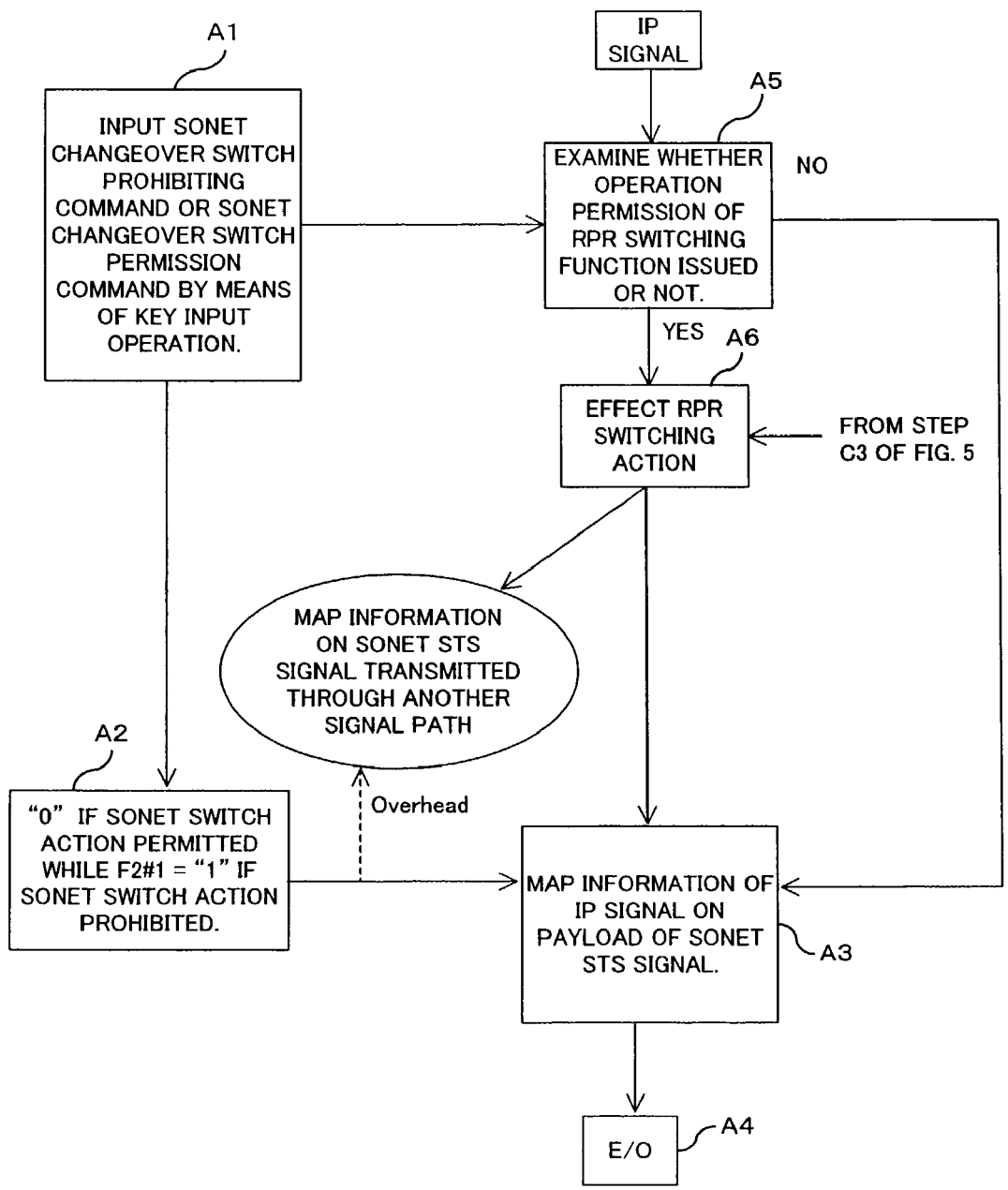
FIG. 3 is a flowchart illustrative of an operation of signal transmission side in the RPR apparatus provided in the first embodiment to which reference is made for explaining how the signal is transmitted from one RPR apparatus through a BLSR to a target RPR apparatus.
Figure 4:
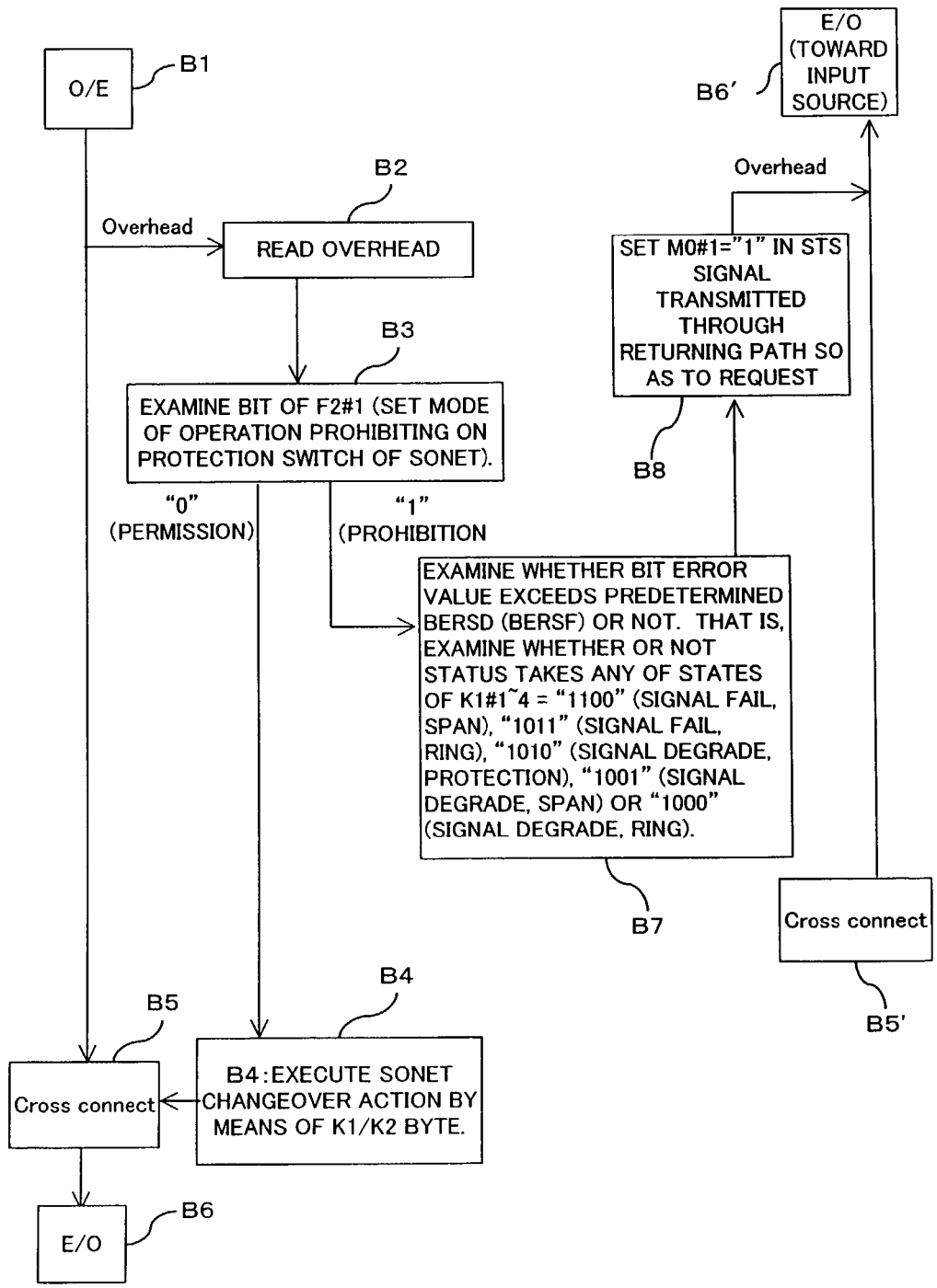
FIG. 4 is a flowchart illustrative of an operation in the SONET apparatus provided in the first embodiment to which reference is made for explaining how the signal is transmitted from one RPR apparatus through the BLSR to the target RPR apparatus.
Figure 5:
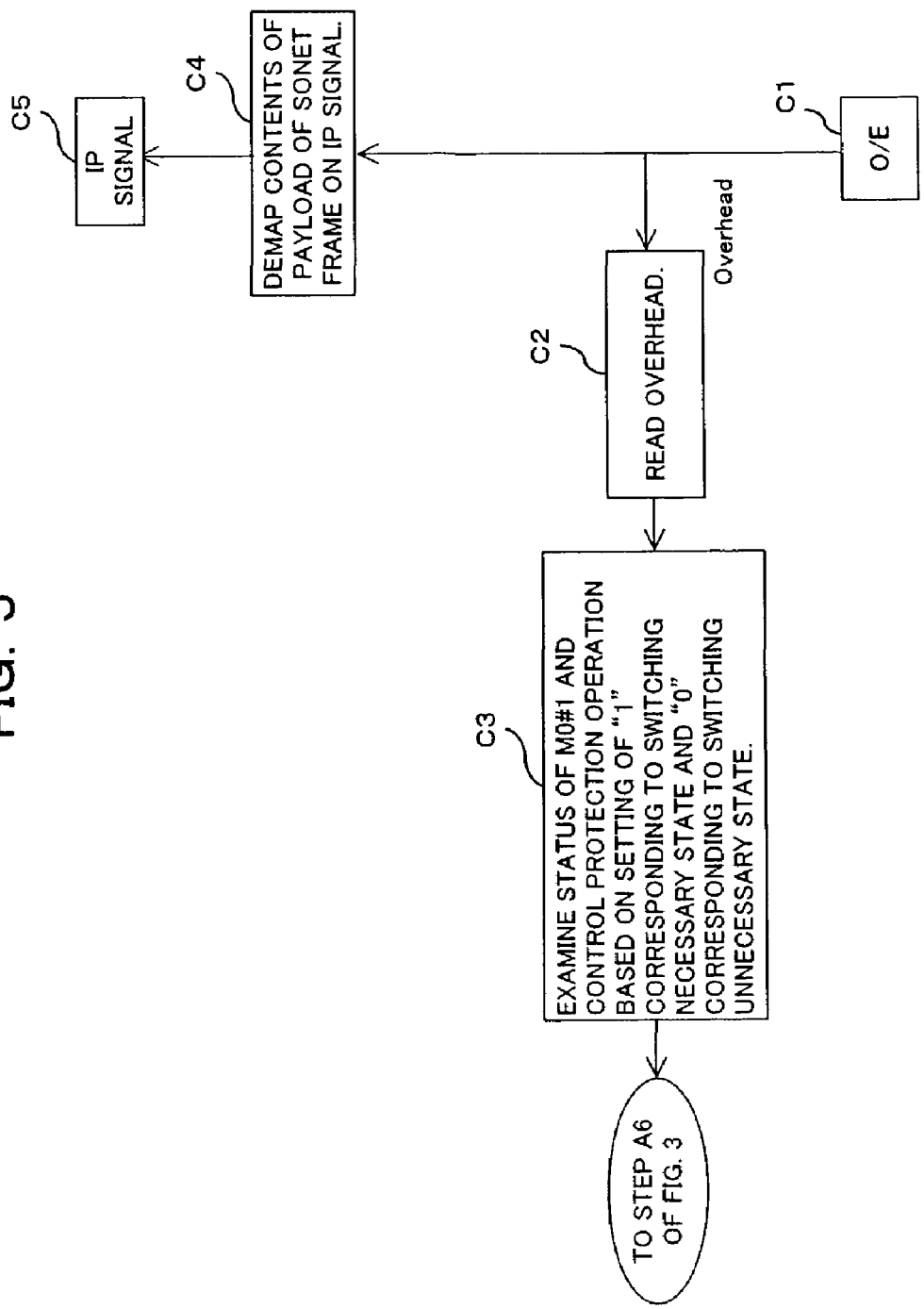
FIG. 5 is a flowchart for explaining an operation of the RPR apparatus on the receiving side in the first embodiment.

FIG. 3 is a flowchart illustrative of an operation of signal transmission side in the RPR apparatus to which reference is made for explaining how the signal is transmitted from the RPR apparatus 11 through the BLSR 20 to the RPR apparatus 12 as a destination, FIG. 4 is a flowchart illustrative of an operation in the SONET apparatus 21 to 24 as a node on the BLSR 20 to which reference is made for explaining how the signal is transmitted from the RPR apparatus 11 through the BLSR 20 to the target RPR apparatus 12, and FIG. 5 is a flowchart for explaining an operation of the RPR apparatus 11 on the receiving side.

Initially, when it is desired to validate the protection function of the RPR apparatus 11, an operator operates the user interface 310 to input a command for permitting the RPR switch operation or a command for prohibiting the RPR switch operation (step A1 of FIG. 3).

If the determination control unit 320 determines that a SONET switch changeover prohibiting command is inputted through the user interface 310, and the RPR apparatus 11 receives an instruction indicating the prohibition of the switch changeover, then the overhead writing unit 150 writes a digit of "1" into an empty bit of the path overhead of the SONET frame, e.g., F2#1 bit. Conversely, if the determination control unit 320 determines that a SONET switch changeover permitting command is inputted through the user interface 310, and the RPR apparatus 11 receives an instruction indicative of the permission of the switch changeover, then the overhead writing unit 150 writes a digit of "0" into the same empty bit (step A2).

If the RPR apparatus 11 receives an instruction indicating the prohibition of the switch changeover, the SONET mapping unit 131 carries out mapping of an IP signal having undergone the switching operation in the switch unit 120 (from "yes" route of step A5 to step A6) together with the overhead information written by the overhead writing unit 150 into the SONET frame [STS signal (Synchronous Transport Signal)] (step A3). Then, the frame signal transmitting unit 141 transmits the SONET frame supplied from the SONET mapping unit 131 as an optical signal (step A4).

Further, if the SONET switch changeover prohibiting command is not accepted, the operator is allowed to set a mode of prohibiting the switching function of the RPR apparatus 11 through the user interface 310. In this case, the IP signal will not undergo the switching operation in the switch unit 120 and be subjected to the mapping operation in the SONET mapping units 131 and 132 to be mapped on the payload of the STS signal (from "no" route of step A5 to step A3). Thereafter, the SONET frame is transmitted by the frame signal transmitting units 141 and 142 as an optical signal (step A4).

Each of the SONET apparatus 21 to 24 constituting the BLSR 20 reads the overhead information of the received SONET frame with its overhead reading unit (steps B1 and B2 of FIG. 4).

Now, the operation of the SONET apparatus 21 will be more fully described. If the determination control unit 600 reads the bit information stored in the F2#1 bit and determines that the digit entered in the bit is "0", the determination control unit 600 controls the switch units 430 and 540 so that the switching in the SONET is executed for effecting the protection.

The received SONET frame is subjected to the SONET changeover execution with K1/K2 byte (from "permission" route of step B3 to step B4) and the switch units 430 and 540 execute cross connect processing (step B5). Thereafter, the SONET frame is directed to its destination apparatus and transmitted as an optical signal by the frame transmitting unit (step B6).

If the determination control unit 600 reads the bit information stored in the F2#1 bit and determines that the digit entered in the bit is "1", the determination control unit 600 controls the switch units 430 and 540 so that the switching in the SONET for prohibiting the protection (from route of "prohibition" of step B3 to step B7).

In this way, if it is desired to validate the protection function of the RPR apparatus 11, the RPR apparatus 11 generates an invalidating request indicating that the protection function of the BLSR 20 in the SONET apparatus 21 shall be invalidated. On the side of the SONET apparatus 21 having received the invalidating request from the RPR apparatus 11, the protection function of the BLSR 20 is controlled to be invalid so that the RPR apparatus 11 can bring its protection function into the operation allowable mode.

Further, as described above, the bit information is delivered by using an empty bit, i.e., F2#1 bit of the path over head of the SONET frame which is transmitted among the SONET apparatus 21 to 24 constituting the BLSR 20 together with the RPR apparatus. Therefore, the invalidating request instruction can be delivered throughout the all SONET apparatus 21 to 24 constituting the BLSR 20 including the RPR apparatus 11.

As described above, a signal from the RPR apparatus 11 can be sent to the RPR apparatus 12 by using both of the paths 20-1 and 20-2 (see FIG. 2). Also, a signal can be sent from the RPR apparatus 12 to the RPR apparatus 11 in a similar manner.

At this time, for example, the determination control unit 600 of the SONET apparatus 21 determines whether the bit error rate measured by the BER measuring unit 530 exceeds the predetermined threshold value [BERSD (BERSF)] or not. In more concretely, bit information status of K1#1 to K1#4 is examined and if it is determined that the bit information status takes any of states of K1#1~4="1100" (Signal Fail, span), "1011" (SignalFail, ring), "1010" (SignalDegrade, protection), "1001" (Signal Degrade, span) or "1000" (Signal Degrade, ring), then it is determined that the bit error rate value exceeds the predetermined threshold value. Therefore, the determination control unit 600 supplies an instruction to the overhead writing unit 551 to force the overhead writing unit 551 to write overhead information which requests from the RPR apparatus that the switching is selected for activating the protection function (RPR protection operation by the RPR apparatus) (step B7).

In more concretely, the overhead writing unit 551 writes a digit of "1" into the M0#1 bit of the STS signal of the transmission path (step B8).

Thus, the SONET frame is made to have the digit of "1" written into the M0#1 bit constituting the overhead thereof, the digit of "1" requesting the protection operation from the RPR apparatus 11. Then, the SONET frame is transmitted by the frame transmitting unit 561 to the RPR apparatus 11 as the destination thereof through the switch unit 540 which undergoes a cross connect processing (step B5', step B6').

The overhead reading unit 221 of the RPR apparatus 11 reads the overhead information of the SONET frame received by the frame receiving unit 211. The result of the reading is sent to the determination control unit 320 (steps C1 and C2 of FIG. 5).

If the overhead reading unit 221 reads a digit of "0" from the M0#1 bit, it is unnecessary for the determination control unit 320 to carry out switch changeover control. But if the overhead reading unit 221 reads a digit of "1" from the M0#1 bit, the determination control unit 320 outputs an instruction to the switch unit 120 so that the protection function of the RPR apparatus 11 is activated (step C3).

Meanwhile, the payload information of the SONET frame is subjected to a demapping processing in the demapping unit 231 to be demapped on the IP signal. The IP signal having the payload information demapped thereon is subjected to a switching operation in the switch unit 240 and transmitted to a destination terminal thereof by the packet transmitting units 251 to 253 (steps C4 and C5).

The switch unit 120 responds to the above-described control of the determination control unit 320 so that the SONET signal is directed to a path different from one selected when the bit error rate exceeds the threshold value. That is, the IP signal as a payload is subjected to a mapping process together with the overhead information on the SONET signal (STS signal) which is directed to the path different from one selected when the bit error rate exceeds the threshold value, and resultant signal is transmitted as an optical signal (from step C3 to steps A6 and A7 of FIG. 3).

If the network is placed in a mode in which the protection function of the RPR apparatus 11 is operable, the SONET apparatus 21 to 24 constituting the BLSR 20 examines the network condition in the BLSR 20. If it is determined that it is necessary to activate the protection function of the RPR apparatus 11 based on the result of the examination, a request message for activating the protection function of the RPR apparatus 11 is sent to the RPR apparatus, and the RPR apparatus 11 responds to the request to carry out the protection control.

When the SONET apparatus 21 to 24 send the request message for activating the protection function of the RPR apparatus 11, the SONET apparatus 21 to 24 send the request message by using the M0#1 bit as an empty bit of a line overhead of the SONET frame which is sent to the RPR apparatus 11.

As described above, according to the first embodiment of the present invention, in the communication network having the BLSR 20 connected with the RPR apparatus 11 and 12 in which each of the BLSR 20 and the RPR apparatus 11 and 12 has its independent protection function, activating state allowable mode is placed exclusively in one of the protection function of the SONET (protection function of the BLSR 20) and the protection function of the RPR apparatus 11 and 12 (the protection function of the RPR 10). Therefore, it becomes possible to reliably avoid the conflict between the protection function of the SONET and the protection function of the RPR apparatus 11 and 12 (the protection function of the RPR 10), and it becomes possible to secure network reliability.

Furthermore, it becomes possible to suppress the unstable reciprocal switching action which would be brought about on the RPR when the protection switch function of the BLSR 20 and the protection switch function of the RPR 10 conflict with each other.

Moreover, the protection function provided in the network can be designed to have a reasonable level of redundancy which would be prepared for handling the coexistence of the working bandwidth for the BLSR 20 and the bandwidth for the protection function.

[B] Description of Second Embodiment

FIG. 2 also shows an RPR 10A as a communication network according to a second embodiment of the present invention. As shown in FIG. 2, the RPR 10A includes a BLSR 20A connected with RPR apparatus 11A and 12A, similarly to the case of the aforesaid first embodiment. The BLSR 20A is arranged to include four SONET apparatus 21A to 24A connected to one another through optical fibers so as to form a ring-like network.

As described above, each of the resilient packet ring (RPR) and the synchronous optical network (SONET) is provided with a protection function that can be activated independently. However, the RPR 10A shown in FIG. 2 has the following particular control function. That is, similarly to that of the first embodiment, the network of the second embodiment can be placed in a mode in which the protection function of the BLSR can be activated. Under this condition, if any of the SONET apparatus 21A to 24A is brought into a switching mode in which the protection function of the BLSR is halted, the RPR responds to the switching mode change in the BLSR and the protection function of the RPR is activated.

In the above arrangement, it becomes possible to avoid the conflict between the protection function of the BLSR, i.e., the protection function of the SONET and the protection function of the RPR. At the same time, even if the network is placed in a mode where the SONET protection function can be activated, when any of the BLSR network component is brought into a switching mode that the protection function is substantially halted, the RPR responds to the switching mode change brought about in the component and the protection function of the RPR is activated. Thus, the network reliability can be secured.

That is, in the arrangement of the RPR 10A of the second embodiment, in addition to the protection control function of the aforesaid first embodiment, the RPR apparatus 11A or 12A is arranged to have a function for monitoring whether or not the SONET apparatus 21A to 24A constituting the BLSR 20A take place the switching mode for halting the protection function of the BLSR 20A. If the switching mode for invalidating the protection function of the BLSR 20A is taken place in accordance with the result of the monitoring, then the protection function of the RPR apparatus 11A or 12A is validated. Conversely, if the switching control mode for keeping the validated state of the protection function of the BLSR 20A is taken place, then the protection function of the RPR apparatus 11A or 12A is invalidated. In this way, control is made to avoid conflict between the protection function of the BLSR and that of the RPR.

Figure 6:
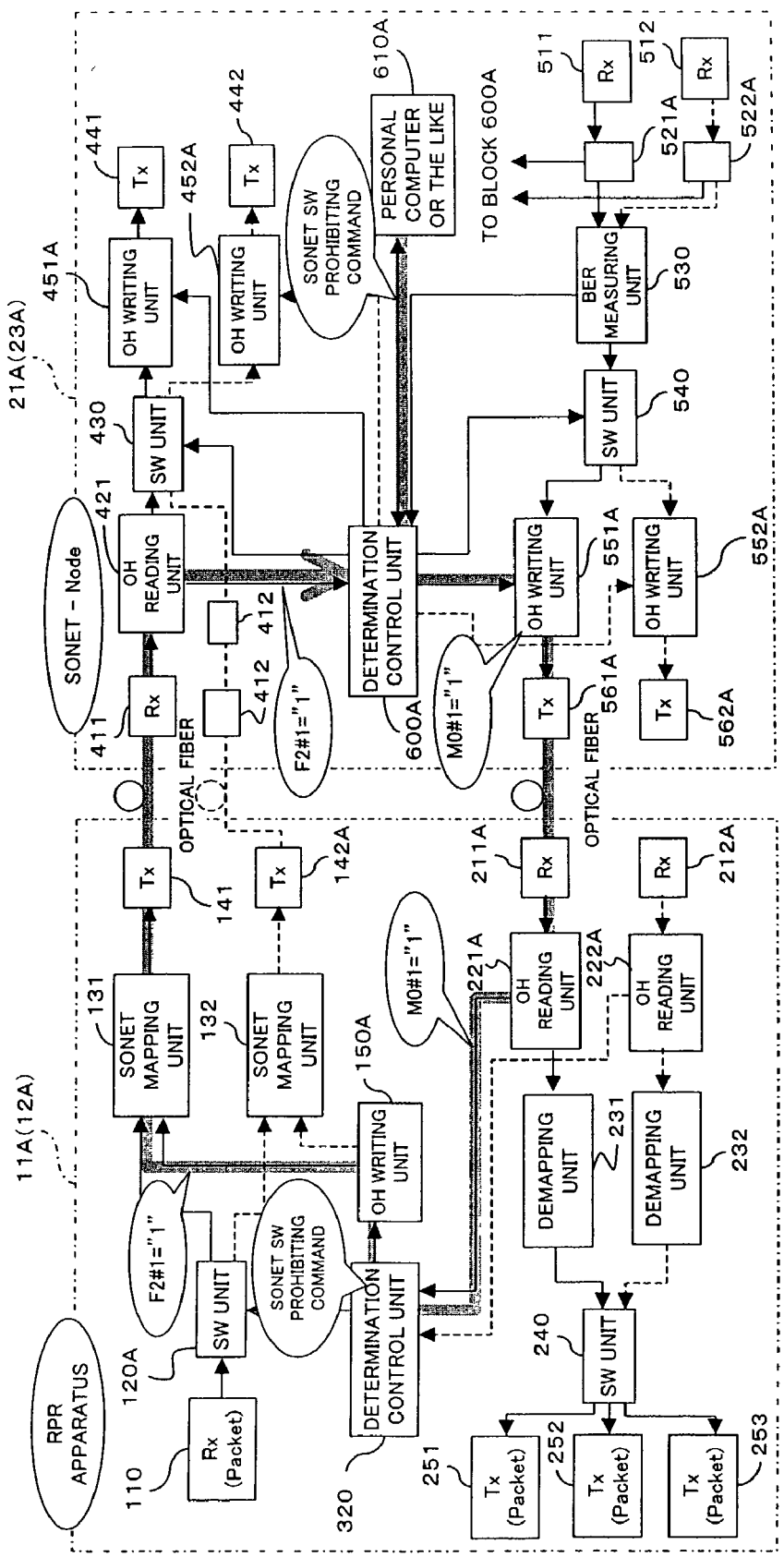
FIG. 6 is a block diagram showing an RPR apparatus and a SONET apparatus employed in a second embodiment of the present invention.

According to the second embodiment, in order to realize the above-described protection function, the RPR apparatus 11A and 12A which are provided on the side for transmitting a signal to the BLSR 20A and the SONET apparatus 21A and 23A which are provided on the side for receiving the signal sent from the RPR apparatus 11A or 12A have an arrangement as illustrated in FIG. 6.

The RPR apparatus 11A and 12A and the SONET apparatus 21A and 23A may have fundamentally the same arrangements as those of the aforesaid first embodiment (see components identified by reference numerals 11, 12, 21 and 23 in FIG. 1). However, if the component of FIG. 6 has any different part from that of the first embodiment for realizing a different control function, such a component in FIG. 6 is attached with a reference numeral "A" in addition to the corresponding reference numerals of the aforesaid first embodiment. Further, in FIG. 6, components substantially the same as those in FIG. 1 are identified by the same reference numerals.

As shown in FIG. 6, the user interface 310, which is provided in the RPR apparatus 11, 12 of the first embodiment, does not appear in the left part of the diagram, or the block of the RPR apparatus 11A or 12A of the second embodiment. This is merely an illustration convenience. Thus, the user interface 310 may be provided in the RPR apparatus 11A or 12A of the second embodiment. Further, as shown in FIG. 6, the SONET apparatus 21A, 23A of the second embodiment is provided with a user interface 610A and overhead writing units 451A and 452A which are not provided in the SONET apparatus 21, 23 of the first embodiment.

Now, description will be hereinafter mainly made in detail mainly on the arrangement of the RPR apparatus 11A and the SONET apparatus 21A.

The SONET apparatus 21A is arranged to include the user interface 610A, a determination control unit 600A, overhead writing units 451A, 452A, 551A, 552A, and frame transmitting units 561A and 562A, as a function unit for realizing the protection function which is additionally provided in the second embodiment.

The user interface 610A is formed of a personal computer or the like and arranged so that a user can set the management state of the SONET apparatus 21A. In particular, the user can set through the user interface 610A, a switching mode such as a mode of Lockout of Protection or Forced switch in which the protection function of the BLSR 20A is substantially halted.

Accordingly, the above-described determination control unit 600A can function as a determining unit for determining whether the switching mode for halting the protection function of the BLSR 20A is substantially halted is set or not.

The determination control unit 600A can also respond to the information inputted from the above-described user interface 610A or the result of analysis on the overhead reading information (K1/K2 byte) read by the overhead reading units 521A or 522A in such a manner that the determination control unit 600A determines whether or not the above-described mode of Lockout of Protection or Forced Switch in which the protection function of the BLSR 20A is substantially halted is set to the SONET apparatus 21A as its own node.

If the determination control unit 600A determines that the above-described mode of Lockout of Protection or Forced Switch is set to the SONET apparatus 21A as its own node, the determination control unit 600A sends an instruction indicating the result of the determination to the RPR apparatus 11A by using an empty bit (e.g., a bit of M0#2) of the line overhead of the SONET frame which is directed to the RPR apparatus 11A.

In other words, the SONET apparatus 21A transmits a SONET frame having a digit of "1" written in the bit of M0#2 by the overhead writing unit 551A to the RPR apparatus 11A through the frame transmitting unit 561A. The RPR apparatus 11A receives this SONET frame as a request message requesting that protection function valid mode shall be placed in the RPR apparatus 11A.

Conversely, if the determination control unit 600A determines that the above-described mode of Lockout of Protection or Forced Switch is not for the SONET apparatus 21A as its own node, then a digit of "0" is written in the bit of M0#2 of the SONET frame which is directed to the RPR apparatus 11A. Then, the SONET frame having the digit of "0" written in the bit of M0#2 is transmitted through the frame transmitting unit 561A to the RPR apparatus 11A.

Accordingly, the above-described overhead writing unit 551A (552A) and the frame transmitting unit 561A (562A) can function as an informing unit which responds to the result of determination of the determination control unit 600A in such a manner that, when the switching mode for halting the protection function of the BLSR 20A is set, an instruction indicating that the above-described switching mode is set is sent to the RPR apparatus 11A, whereby the protection function of the RPR apparatus 11A is activated.

Similarly to the units (see reference numerals 221 and 222 in FIG. 1), the overhead reading units 221A and 222A of the RPR apparatus 11A are each unit for reading overhead information of the SONET frame sent from the SONET apparatus 21A constituting the BLSR 20A.

The determination control unit (control unit) 320A is a unit for determining whether or not the protection operation is requested from the RPR apparatus 11A based on the overhead information read from the overhead reading units 221A and 222A (i.e., whether or not control is made to take place a mode in which the protection function can be activated).

In more concretely, if a bit of "1" is written in the M0#2 bit of the overhead of the SONET frame received from the SONET apparatus 21A, the determination control unit 320A determines that control is requested to place the protection operation of the RPR apparatus 11A in an active state. Conversely, if a bit of "0" is written in M0#2 bit of the overhead of the SONET frame, the determination control unit 320A determines that control is requested to place the protection operation of the RPR apparatus 11A in an inactive state.

Accordingly, the aforesaid overhead reading units 221A and 222A and the determination control unit 320A function as a monitoring unit for monitoring whether or not request is made by the SONET apparatus 21A to 24A within the RPR 10A as a communication network so that the protection operation allowable mode is taken place in the RPR apparatus 11A.

Furthermore, the RPR apparatus can be supplied with information indicating whether or not the SONET apparatus 21A connected to the RPR apparatus 11A is brought into the switching mode halting the protection function in the BLSR 20A. The RPR apparatus 11A responds to the information indicating whether the switching mode halting the protection function in the BLSR 20A is brought about or not, and carries out the above-described monitoring operation in accordance with the response.

When the control is made to take place the mode in which the protection function of the RPR apparatus 11A is made allowable in accordance with the result of the monitoring of the determination control unit 320A as a part of the monitoring unit, the switch unit 120A is controlled to take place the mode in which switching operation effected by the protection function of the RPR apparatus 11A can be activated.

At this time, similarly to the aforesaid first embodiment, when the determination control unit 320A receives a changeover request by using M0#1 bit, for example, the switch unit 120A responds to the control of the determination control unit 320A to change the connection to a path other than one suffering from a failure that the bit error rate exceeds a predetermined threshold value [e.g., BERSD (BERSF)].

Meanwhile, if the determination control unit 320A carries out the monitoring, and as a result, it is determined that control is requested to take place a mode in which the protection function can be activated in the RPR apparatus 11A, then the switch unit 120A is controlled in accordance with the determination. Further, an informing message is sent to the SONET apparatus 21A for informing the SONET apparatus 21A that control is made to take place the protection operation allowable mode in the RPR apparatus 11A, by using an empty region (e.g., F2#1) of a path over head of the SONET frame directed to the SONET apparatus 21A.

Also in this case, similarly to the first embodiment, if information indicating the halting of the protection function of the RPR apparatus 11A is delivered so that the protection function of the BLSR 20A can be activated, a digit of "0" is entered in the bit of F2#1 of the path overhead of the SONET frame directed to the SONET apparatus 21A. Conversely, as described above, if a mode is taken place so that the protection function of the RPR apparatus 10A can be activated in the RPR apparatus 10A, a digit of "1" is entered in the bit of F2#1 of the path overhead of the SONET frame directed to the SONET apparatus 21A.

Now description will be made mainly on the protection control operation carried out in the RPR 10A having the above-described arrangement as a communication network as the second embodiment of the present invention. The description of the protection control operation will be made intensively on a case where a signal is sent from the RPR apparatus 11A to the RPR apparatus 12A through the BLSR 20A, with reference to flowcharts of FIGS. 7 to 9.

Figure 7:
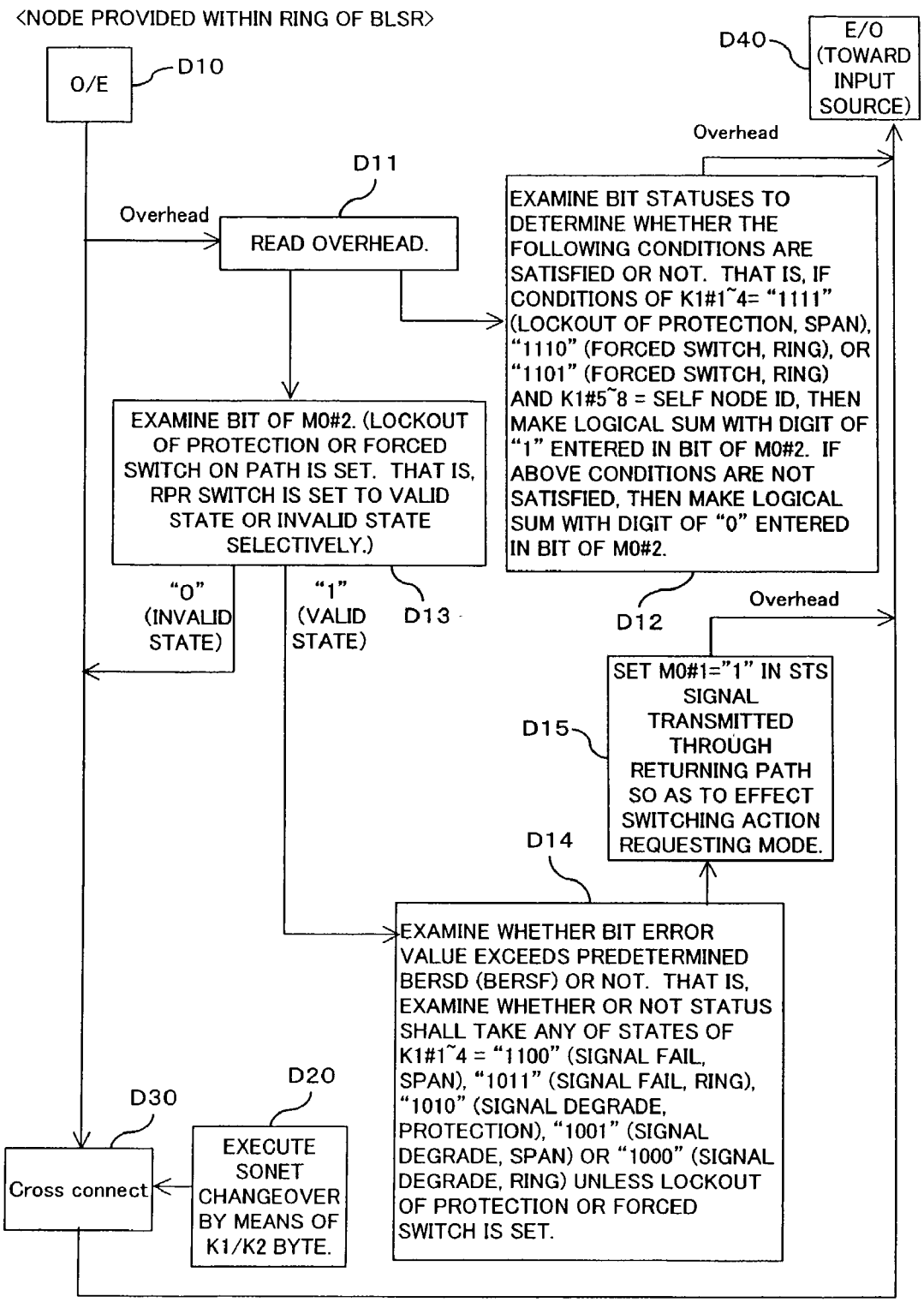
FIG. 7 is a flowchart illustrative of an operation of signal transmission in the SONET apparatus provided in the second embodiment to which reference is made for explaining how the signal is transmitted from one RPR apparatus through a BLSR to a target RPR apparatus.
Figure 8:
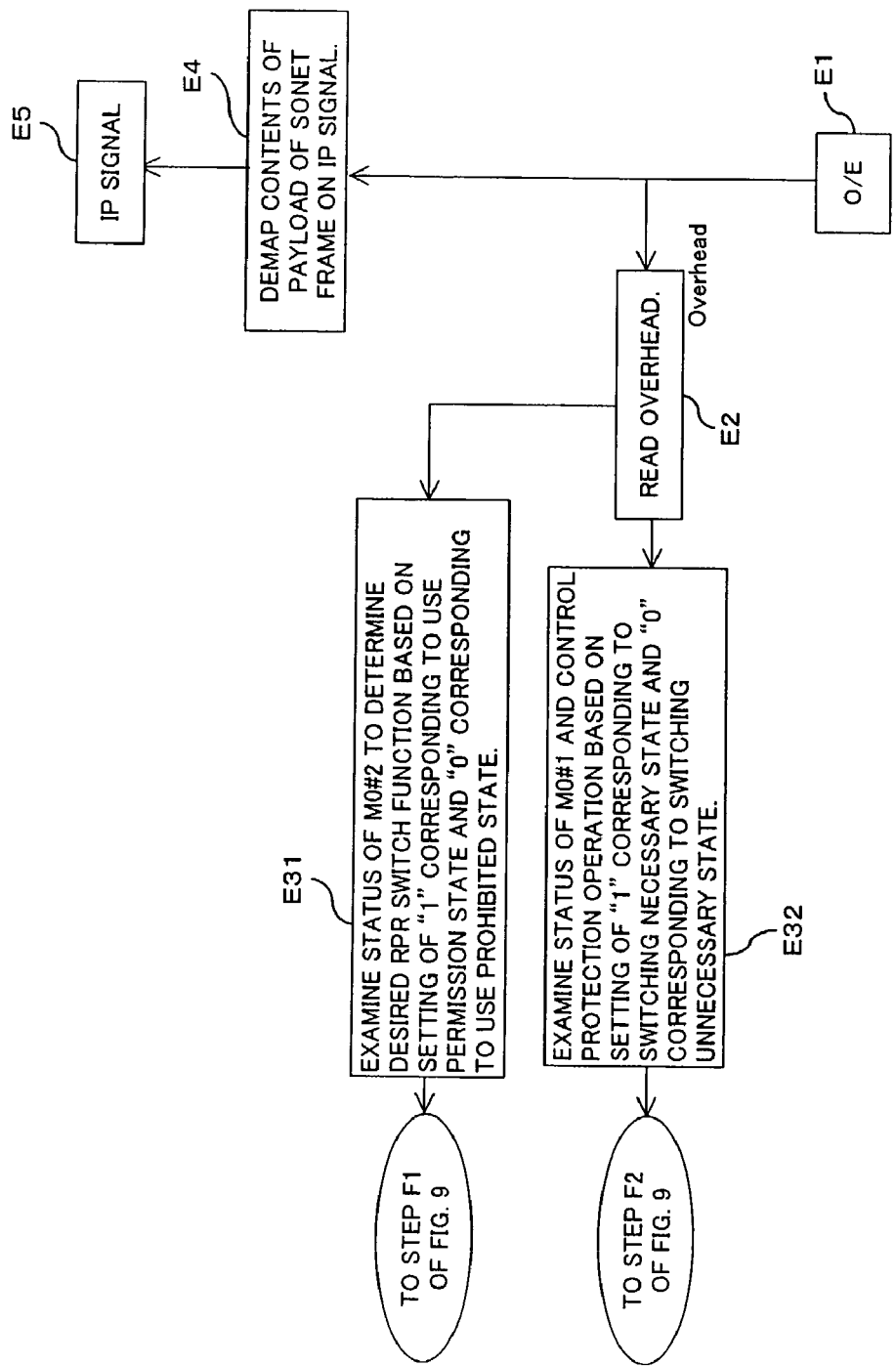
FIG. 8 is a flowchart for explaining an operation of the RPR apparatus on the receiving side in the second embodiment.
Figure 9:
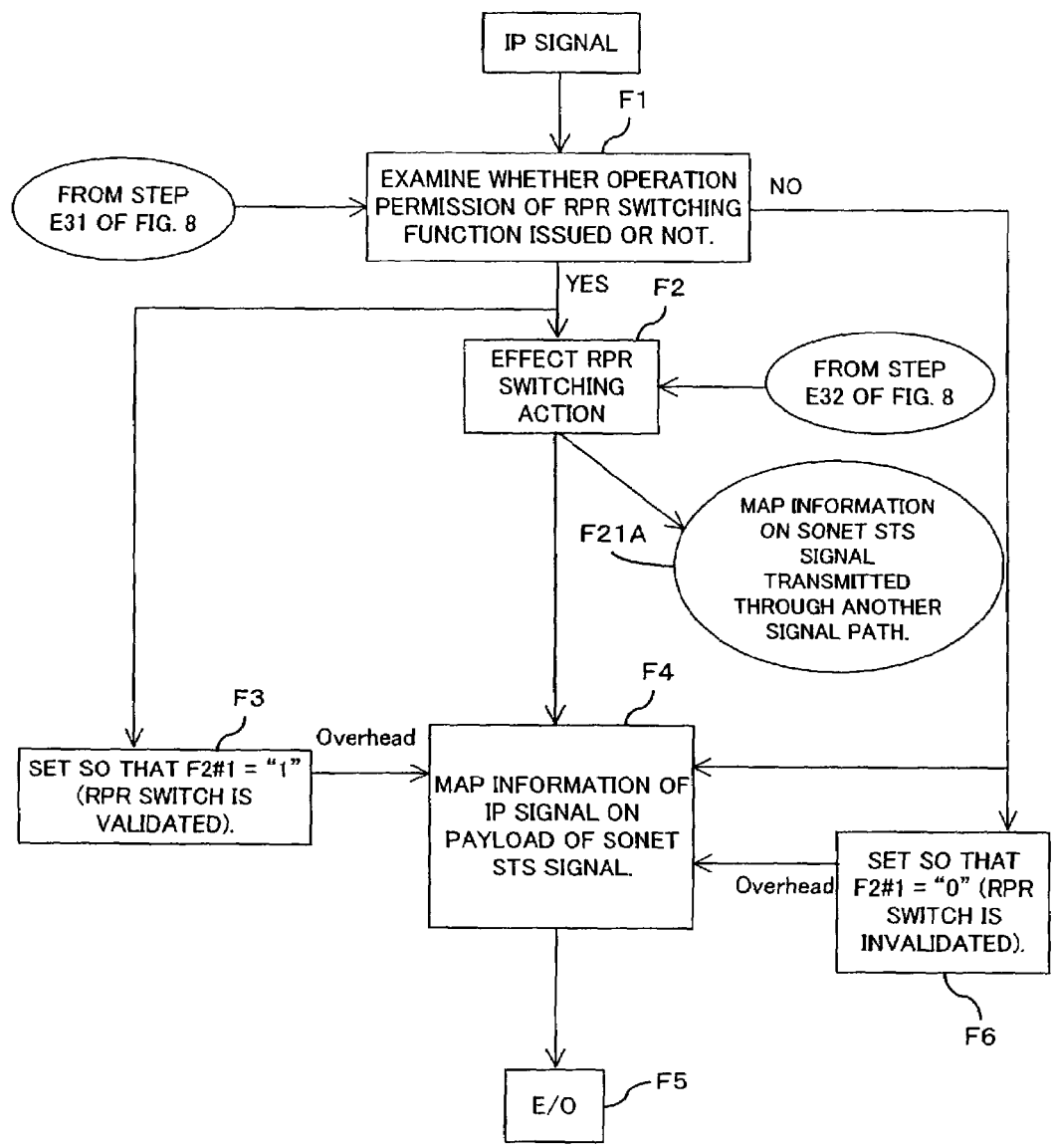
FIG. 9 is a flowchart illustrative of an operation of signal transmission in the RPR apparatus provided on the transmitting side to which reference is made for explaining how the signal is transmitted from one RPR apparatus through the BLSR to the target RPR apparatus.

FIG. 7 is a flow chart illustrative of an operation of signal transmission in the SONET apparatus 21A to 24A serving as nodes in the BLSR 20A to which reference is made for explaining how the signal is transmitted from the RPR apparatus 11A through the BLSR 20A to the target RPR apparatus 12A. FIG. 8 is a flowchart for explaining an operation of the RPR apparatus 11A on the receiving side. And FIG. 9 is a flowchart illustrative of an operation of signal transmission in the RPR apparatus 11A provided on the transmitting side to which reference is made for explaining how the signal is transmitted from the RPR apparatus 11A through the BLSR 20A to the target RPR apparatus 12A.

In the RPR apparatus 10A of the second embodiment, when the mode is taken place so that the protection function can be activated in the SONET, the SONET frame is transmitted from the RPR apparatus 11A by way of the BLSR 20A. At this time, the SONET apparatus 21A connected to the RPR apparatus 11A notifies the RPR apparatus 11A of whether the switching mode for halting the protection function by the BLSR 20A is set or not.

In other words, in the SONET apparatus 21A constituting the BLSR 20A, the determination control unit 600A controls the switch units 430 and 540 so that the switching is made to effect protection of the SONET.

At this time, if the RPR apparatus 11A is not placed in the protection function allowable mode and the RPR apparatus 11A receives no instruction about the switching, then the received SONET frame undergoes a SONET switch changeover by K1/K2 bytes (step D20) and cross connect processing is executed by the switch units 430 and 540 (step D10, D11, invalid state of step D13 to step D30 in FIG. 7). Thereafter, the SONET frame is transmitted as an optical signal by the frame transmitting units 561A and 562A which are directed to the destination side apparatus (in this case, RPR apparatus 11A) (step D40).

At this time, the overhead reading units 521A and 522A read the overhead information in the received SONET frame (step D11 of FIG. 7). In accordance with the result of analysis made by the determination control unit 600A on the information which is read from the overhead information at bits of K1 #1 to 4, the overhead writing units 551A and 552A updates the contents of bit of M0#2 for the SONET apparatus 21A as its own node depending on the written request message of "Lockout of Protection" or "Forced Switch".

In more concretely, the overhead writing units 551A and 552A examine bit statuses of K1#1~4 to determine whether the following conditions are satisfied or not. That is, if conditions of K1#1~4="1111" (Lockout of Protection, span), "1110" (Forced Switch, span), or "1101" (Forced Switch, ring) and K1#5~8 indicates the own node ID (in this case, the own node is the SONET apparatus 21A), then logical sum with digit of "1" entered in bit of M0#2 is created for updating the entered value. If the above conditions are not satisfied, then logical sum with digit of "0" entered in bit of M0#2 is created for updating the entered value (step D12).

If the SONET frame having the digit of "1" written in the bit of M0#2 is sent to the RPR apparatus 11A through the frame transmitting unit 561A, the frame receiving unit 211A of the RPR apparatus receives the SONET frame having the bit of "1" written in the bit of M0#2, and the overhead reading unit 221A reads the overhead information having the bit of "1" written in the overhead at the bit of M0#2 (step E1 and step E2 of FIG. 8).

The payload information of the received SONET frame is subjected to a demapping processing onto an IP signal in the demapping unit 231. The IP signal having the payload information demapped thereon undergoes switching action in the switch unit 240 and transmitted by the packet transmitting units 251 to 253 which are directed to a destination terminal (steps E4 and E5).

The determination control unit 320A of the RPR apparatus 11A analyzes the overhead information read by the overhead reading unit 221A. If it is determined that a digit of "1" is written in the bit of M0#2 as a result of the analysis, the RPR switch function (protection function of the RPR apparatus 11A) is brought into a use permission state. Conversely, if it is determined that a digit of "0" is written in the bit of M0#2 as a result of the analysis, the RPR switch function (protection function of the RPR apparatus 11A) is brought into a use prohibited state. Thus, the switch unit 120A is controlled depending on the result of each determination (step E31).

In more concretely, the switch unit 120A responds to the control of the aforesaid determination control unit 320A in such a manner that if the protection function of the RPR apparatus 11A is brought into the use permission state (and if a switching request, which will be described later on, has not been supplied thereto), the switch unit 120A effects switching in an ordinary manner for the IP signal supplied thereto (from "yes" route of step F1 to step F2 of FIG. 9).

Furthermore, in order to inform the SONET apparatus 21A that the protection function of the RPR apparatus 11A is brought into the activation allowable mode, the overhead writing unit 150A writes a digit of "1" into the bit of F2#1 of the path overhead of the SONET frame which is directed to the BLSR 20A (step F3).

In this way, the SONET frame having the IP signal mapped thereon by the SONET mapping unit 131 is transmitted to the SONET apparatus 21A through the frame transmitting unit 141 (steps F4 and F5).

If the protection function of the RPR apparatus 11A is brought into the use prohibited state in accordance with the control of the aforesaid determination control unit 320A, the switch unit 120A effects switching for sending the IP signal to the SONET mapping unit 131 in which the supplied IP signal is subjected to the mapping operation. In this case, the switch unit 120A will not carry out the above-described switching for the IP signal which might be carried out if the protection function of the RPR apparatus 11A is brought into the use permission state (from "no" route of step F1 to step F4 in FIG. 9).

Furthermore, in order to inform the SONET apparatus 21A that the protection function of the RPR apparatus 11A is brought into the activation prohibited mode, the overhead writing unit 150A writes a digit of "0" into the bit of F2#1 of the path overhead of the SONET frame which is directed to the BLSR 20A (step F6).

In this way, the SONET frame having the IP signal mapped thereon by the SONET mapping unit 131 together with the overhead information is transmitted to the SONET apparatus 21A by means of the frame transmitting unit 141 (steps F4 and F5).

As described above, if control is made so that the protection function of the RPR apparatus 11A can be activated (i.e., modes of Lockout of Protection or Forced Switch is set on the path), for example, the determination control unit 600A of the SONET apparatus 21A determines whether or not the bit error rate measured by the BER measuring unit 530 exceeds a predetermined threshold value, i.e., BERSD (BERSF), similarly to the case of the first embodiment (from "valid state" route of step D13 to step D14).

That is, the determination control unit 600A determines whether or not the bit error rate measured by the BER measuring unit 530 exceeds the predetermined threshold value. At this time, it is examined whether or not the bit states of K1#1~K1#4 are set to any of "1100" (Signal Fail, span), "1011" (Signal Fail, ring), "1010" (Signal Degrade, protection), "1001" (Signal Degrade, span) or "1000" (Signal Degrade, ring). If the bit states of K1#11~K1#4 take any of the four states, it is determined that the measured bit error rate exceeds the predetermined threshold value, and the determination control unit 600A provides an instruction to the overhead writing unit 551A so that the overhead writing unit 551A writes overhead information which requests the protection operation from the RPR apparatus 11A (protection operation effected by the RPR).

In more concretely, the overhead writing unit 551A enters a digit of "1" in the bit of M0#1 of the line overhead of an STS signal directed to the RPR apparatus 11A as a returning path (step D15).

The frame transmitting unit 561A sends the SONET frame having the digit of "1" written in the bit of M0#1, which constitute a part of the overhead, to the RPR apparatus 11A as a destination, whereby the protection operation (RPR switching) is requested from the RPR apparatus 11A (step D40). If the above-described condition is not satisfied, a bit of "0" is written in the bit of M0#1 of the SONET frame to be transmitted.

As described above, when the SONET frame containing the overhead information requesting the protection operation from the RPR apparatus 11A is received by the frame receiving unit 211A of the RPR apparatus 11A (step E1 of FIG. 8), the overhead reading unit 221A reads the overhead information of the SONET frame sent from the SONET apparatus 21A which constitutes the BLSR 20A (step E2).

The determination control unit 320A controls the switch unit 120A in its switching operation in accordance with the value of the bit of M0#1 of the line overhead of the overhead information which are read by the overhead reading units 221A and 222A (step E32).

If it is determined that a value of "1" is set in the bit of M0#1 by the reading operation, the determination control unit 320A determines that the switching operation is requested (i.e., the protection function of the RPR apparatus 11A shall be activated). Conversely, if it is determined that a value of "0" is set in the bit of M0#1 by the reading operation, the determination control unit 320A determines that the switching operation is not requested (i.e., the protection function of the RPR apparatus 11A shall not be activated).

Further, when the protection function of the RPR apparatus 11A is requested to be activated under the control of the determination control unit 320A, the switch unit 120A is controlled so as to take place the switching allowable mode in which the protection function can be activated by the RPR apparatus 11A.

That is, when the switch unit 120A receives a control message concerning the switching operation for the inputted IP signal from the determination control unit 320A, the switch unit 120A responds to the control message by selecting a path other than one having brought about any failure that the bit error rate exceeds the predetermined threshold value [e.g., BERSD (BERSF)]. In ordinary case, the IP signal is transmitted by using both of the paths 20-1 and 20-2. In this case, however, when the switching operation is carried out based on the protection function of the RPR apparatus 11A, only a path, e.g., 20-2, which is free from the failure is selected from the paths 20-1 and 20-2 (steps F2 and F21A of FIG. 9).

As described above, according to the second embodiment of the present invention, in the communication network including the BLSR 20A and the RPR apparatus 11A and 12A, each of which has its own protection function, it becomes possible to avoid the conflict between the protection switch function of the BLSR 20A and the protection function of the RPR 10A. Moreover, if the protection switching function of the BLSR 20A is substantially brought into a halted mode due to the switching status of the SONET apparatus 21A to 24A as nodes of the BLSR 20A, the protection function of the RPR 10A can be automatically brought into the operation allowable mode. Accordingly, the reliability of the network can be more improved.

Furthermore, it becomes possible to suppress the unstable reciprocal switching motion which would be brought about on the RPR when the protection switch function of the BLSR 20A and the protection switch function of the RPR 10A conflict with each other.

While in the above description of the embodiment description has been made mainly on a case in which a signal is transmitted from the RPR apparatus 11A to the RPR apparatus 12A, the signal may also be transmitted from the RPR apparatus 12A to the RPR apparatus 11A.

[C] Other Disclosure

In the above second embodiment, the arrangement thereof is made so that a new protection function is additionally attached to the function of the first embodiment. However, according to the present invention, the arrangement of the second embodiment may not be provided with the protection function of the first embodiment but may be arranged in the following manner. That is, if the protection operation of the BLSR 20A is placed under the operation allowable mode and a switching mode is set to prohibit the protection function of the BLSR 20A from being activated, then the RPR responds to the switching mode setting to activate the protection function of the RPR.

In this case, the arrangement need not be provided with the user interface 310 which is, although not shown in FIG. 6, utilized when a user inputs a command for prohibiting the protection function of the BLSR 20 from being activated.

What is claimed is:

1. A method of effecting protection control for use in a communication network including a bidirectional line-switched ring (BLSR) composed of a plurality of synchronous optical network (SONET) apparatuses connected to one another to form a ring, and a resilient packet ring (RPR) apparatus being connected to one of the plurality of SONET apparatuses so that the plurality of SONET apparatuses and the RPR apparatus configure a RPR network, each of the BLSR and the RPR network having an independent protection function such that a signal path is switched from a working line to a redundantly-provided-protection line when any failure is brought about in the working line, the method comprising the steps of:

deactivating the protection function of the RPR network when a ring switching of the BLSR is activated; and deactivating the ring switching of the BLSR when the protection function of the RPR network is activated.

2. A method of effecting protection control for use in a communication network according to claim 1, wherein the RPR apparatus generates a deactivating request instructing that the protection function of the BLSR of the SONET apparatuses is to be deactivated when the protection function of the RPR network is activated, and the SONET apparatuses control the BLSR so that the protection function thereof is deactivated and the protection function of the RPR network is made operable when the SONET apparatus connected to the RPR apparatus receives the deactivating request from the RPR apparatus.

3. A method of effecting protection control for use in a communication network according to claim 2, wherein the deactivating request is transmitted from the RPR apparatus to all of the SONET apparatuses constituting the BLSR by using an empty bit of a path overhead of a SONET frame, which is transmitted or received among the SONET apparatuses constituting the BLSR and the RPR network.

4. A method of effecting protection control for use in a communication network according to claim 2, wherein the SONET apparatuses constituting the BLSR examine the network state of the BLSR when the protection function of the RPR network is made operable, an activating request of the protection function of the RPR network is sent to the RPR apparatus when it is determined that it is necessary to activate the protection function of the RPR network in accordance with a result of the examination, and control is made to bring the protection function into an operation allowable mode in the RPR apparatus in accordance with the request.

5. A method of effecting protection control for use in a communication network according to claim 3, wherein the SONET apparatuses constituting the BLSR examines the network state of the BLSR when the protection function of the RPR network is made operable, an activating request of the protection function of the RPR network is sent to the RPR apparatus when it is determined that it is necessary to activate the protection function of the RPR network in accordance with a result of the examination, and control is made to bring the protection function into an operation allowable mode in the RPR apparatus in accordance with the request.

6. A method of effecting protection control for use in a communication network according to claim 4, wherein the SONET apparatus connected to the RPR apparatus informs the RPR apparatus that the protection function of the RPR network is requested to be activated by using an empty bit of a line overhead of the SONET frame transmitted to the RPR apparatus.

7. A method of effecting protection control for use in a communication network according to claim 5, wherein the SONET apparatus connected to the RPR apparatus informs the RPR apparatus that the protection function of the RPR network is requested to be activated by using an empty bit of a line overhead of the SONET frame transmitted to the RPR apparatus.

8. A method of effecting protection control for use in a communication network according to claim 1, wherein the RPR apparatus monitors whether or not the SONET apparatuses within the communication network are in a switching mode for halting the protection function of the BLSR, the protection function of the RPR network is activated when the RPR apparatus determines that the SONET apparatuses are in the switching mode for halting the protection function of the BLSR, and the protection function of the RPR network is deactivated when the RPR apparatus determines that the SONET apparatuses are to be brought to a switching mode where the protection function of the BLSR is kept activated.

9. A method of effecting protection control for use in a communication network according to claim 8, wherein the SONET apparatus connected to the RPR apparatus informs the RPR apparatus of whether or not the SONET apparatuses within the communication network are in the switching mode for halting the protection function of the BLSR, and the RPR apparatus carries out the monitoring based on information received from the SONET apparatus connected to the RPR apparatus.

10. A method of effecting protection control for use in a communication network according to claim 9, wherein the SONET apparatus connected to the RPR apparatus informs the RPR apparatus of whether or not the SONET apparatuses within the communication network are in the switching mode for halting the protection function of the BLSR by using an empty bit of the line overhead of the SONET frame.

11. A method of effecting protection control for use in a communication network according to claim 8, wherein the switching mode for halting the protection function of the BLSR is effected by Lockout of Protection or Forced Switch.

12. A method of effecting protection control for use in a communication network according to claim 9, wherein the switching mode for halting the protection function of the BLSR is effected by Lockout of Protection or Forced Switch.

13. A method of effecting protection control for use in a communication network according to claim 10, wherein the switching mode for halting the protection function of the BLSR is effected by Lockout of Protection or Forced Switch.

14. A resilient packet ring (RPR) apparatus for use in a communication network including a bidirectional line-switched ring (BLSR) composed of a plurality of synchronous optical network (SONET) apparatuses connected to one another to form a ring, and the RPR apparatus being connected to one of the plurality of SONET apparatuses so that the plurality of SONET apparatuses and the RPR apparatus configure a RPR network, each of the BLSR and the RPR network having an independent protection function such that a signal path is switched from a working line to a redundantly-provided-protection line when any failure is brought about in the working line, the RPR apparatus comprising:
a determining unit for determining whether an instruction indicating that the protection function of the BLSR is to be prohibited from being activated is received or not;
a deactivating request outputting unit for outputting a deactivating request indicating that the protection function of the BLSR in the SONET apparatus is to be deactivated as control information placed in a SONET frame to the plurality of SONET apparatuses forming the BLSR when the determining unit determines that the instruction is received; and
a control unit adapted to activate the protection function of the RPR network when the determining unit determines that the instruction is received.

15. A RPR apparatus according to claim 14, wherein the control unit is further adapted to deactivate the protection function of the RPR network when the determining unit determines that the instruction has not been received.

16. A RPR apparatus according to claim 14, the deactivating request outputting unit comprising:
an overhead writing unit for writing bit information indicative of the deactivating request as overhead information;
a mapping unit for mapping the overhead information written by the overhead writing unit on the SONET frame; and
a transmitting unit for transmitting the SONET frame having the overhead information mapped thereon by the mapping unit to the plurality of SONET apparatuses.

17. A RPR apparatus according to claim 15, the deactivating request outputting unit comprising:
an overhead writing unit for writing bit information indicative of the deactivating request as overhead information;
a mapping unit for mapping the overhead information written by the overhead writing unit on the SONET frame; and
a transmitting unit for transmitting the SONET frame having the overhead information mapped thereon by the mapping unit to the plurality of SONET apparatuses.

18. A resilient packet ring (RPR) apparatus for use in a communication network including a bidirectional line-switched ring (BLSR) composed of a plurality of synchronous optical network (SONET) apparatuses connected to one another to form a ring, and the RPR apparatus being connected to one of the plurality of SONET apparatuses so that the plurality of SONET apparatuses and the RPR apparatus configure a RPR network, each of the BLSR and the RPR network having an independent protection function such that a signal path is switched from a working line to a redundantly-provided-protection line when any failure is brought about in the working line, the RPR apparatus comprising:
a receiving unit adapted to receive a SONET frame from the SONET apparatus connected to the RPR apparatus itself;
a monitoring unit for monitoring whether or not the SONET frame received by the receiving unit includes a request command for activating the protection function of the RPR network from the SONET apparatuses within the communication network; and
a switching unit for carrying out switching operation enabling the protection function of the RPR network to be activated when the monitoring unit determines that the SONET frame received by the receiving unit includes the request command.

19. A RPR apparatus according to claim 18, wherein the monitoring unit is arranged to include an overhead reading unit for reading overhead information from the SONET frame received by the receiving unit, and a determining unit for determining whether the protection function of the RPR network is requested or not, based on the overhead information read by the overhead reading unit.

20. A synchronous optical network (SONET) apparatus for use in a communication network including a bidirectional line-switched ring (BLSR) composed of the plurality of SONET apparatuses connected to one another to form a ring, and a resilient packet ring (RPR) apparatus being connected to one of the plurality of SONET apparatuses so that the plurality of SONET apparatuses and the RPR apparatus configure a RPR network, each of the BLSR and the RPR network having an independent protection function such that a signal path is switched from a working line to a redundantly-provided-protection line when any failure is brought about in the working line, the SONET apparatus comprising:
a receiving unit adapted to receive a SONET frame from the RPR apparatus;
a first determining unit for determining whether or not the receiving unit receives the SONET frame including an instruction to deactivate the protection function of the BLSR; and
a switching unit for carrying out transferring processing of a SONET frame including the instruction to deactivate the protection function of the BLSR to other SONET apparatuses configuring the BLSR, in accordance with the result of determination made by the first determining unit.

21. A SONET apparatus according to claim 20, comprising:
  a second determining unit for determining whether or not the protection function of the RPR network is to be activated under condition that the protection function of the BLSR is deactivated on the basis of bit error rate information; and
  an instructing unit for outputting an instruction to the RPR apparatus for enabling the protection function of the RPR network to be activated, in accordance with the result of determination made by the determining unit.

22. A synchronous optical network (SONET) apparatus for use in a communication network including a bidirectional line-switched ring (BLSR) composed of the plurality of SONET apparatuses connected to one another to form a ring, and a resilient packet ring (RPR) apparatus being connected to one of the plurality of SONET apparatuses so that the plurality of SONET apparatuses and the RPR apparatus configure a RPR network, each of the BLSR and the RPR network having an independent protection function such that a signal path is switched from a working line to a redundantly-provided-protection line when any failure is brought about in the working line, the SONET apparatus comprising:
  a switching unit adapted to switch the signal path to either the working line or the redundantly-provided-protection line in relation to the protection function of the BLSR;
  a determining unit for determining whether or not the switching unit is set to a switching mode wherein the protection function of the BLSR is halted; and
  an informing unit adapted to sending, to the RPR apparatus, an informing message indicating that the switching unit is set to this switching mode, thereby activating the protection function of the RPR network, in accordance with the result of determination made by the determining unit.

* * * * *